(12) United States Patent  
Jones et al.

(10) Patent No.: US 8,078,608 B2
(45) Date of Patent: Dec. 13, 2011

(54) METHOD AND SYSTEM FOR PROMOTION OF A SEARCH SERVICE

(75) Inventors: Scott A. Jones, Carmel, IN (US); Steven M. Kremer, Carmel, IN (US); Jared D. Brown, Indianapolis, IN (US)

(73) Assignee: Chacha Search, Inc., Carmel, IN (US)

( * ) Notice: Subject to any disclaimer, the term of this patent is extended or adjusted under 35 U.S.C. 154(b) by 379 days.

(21) Appl. No.: 11/970,842

(22) Filed: Jan. 8, 2008

(65) Prior Publication Data

US 2008/0168040 A1 Jul. 10, 2008

Related U.S. Application Data

(60) Provisional application No. 60/883,925, filed on Jan. 8, 2007.

(51) Int. Cl.
*G06F 17/30* (2006.01)
(52) U.S. Cl. ........................................................ 707/709
(58) Field of Classification Search .................. 707/705, 707/709, 722, 718, 736, 748, 768, 769, 805; 705/14.16, 26.43
See application file for complete search history.

(56) References Cited

U.S. PATENT DOCUMENTS

| | | | |
|---|---|---|---|
| 5,559,940 A | 9/1996 | Hutson | |
| 5,732,259 A | 3/1998 | Konno | |
| 5,875,231 A | 2/1999 | Farfan et al. | |
| 5,915,010 A | 6/1999 | McCalmont | |
| 6,385,620 B1 | 5/2002 | Kurzius et al. | |
| 6,507,841 B2 | 1/2003 | Riverieulx de Varax | |
| 6,578,010 B1 | 6/2003 | Teacherson | |
| 6,675,159 B1 | 1/2004 | Lin et al. | |
| 6,895,406 B2 | 5/2005 | Fables et al. | |
| 6,901,394 B2 | 5/2005 | Chauhan et al. | |
| 6,975,729 B1 * | 12/2005 | Perlman ........................ | 380/277 |
| 6,983,311 B1 | 1/2006 | Haitsuka et al. | |
| 7,085,806 B1 | 8/2006 | Shapira | |
| 2001/0034646 A1 | 10/2001 | Hoyt et al. | |
| 2002/0019738 A1 * | 2/2002 | Yamamoto ........................ | 705/1 |
| 2002/0167539 A1 | 11/2002 | Brown et al. | |
| 2002/0188527 A1 | 12/2002 | Dillard et al. | |
| 2002/0194049 A1 | 12/2002 | Boyd | |
| 2003/0023487 A1 | 1/2003 | Day | |
| 2003/0088465 A1 | 5/2003 | Monteverde | |
| 2003/0088467 A1 | 5/2003 | Culver | |
| 2003/0120542 A1 | 6/2003 | Arning | |
| 2003/0140037 A1 | 7/2003 | Deh-Lee | |
| 2003/0145001 A1 | 7/2003 | Craig et al. | |
| 2003/0163368 A1 | 8/2003 | Bastone | |
| 2003/0174818 A1 | 9/2003 | Hazenfield | |
| 2003/0198325 A1 | 10/2003 | Bayne | |

(Continued)

OTHER PUBLICATIONS

Unisys, Supplier Recruiter Role, 2003, Unisys, pp. 1-39.*

(Continued)

*Primary Examiner* — Fred I Ehichioya
(74) *Attorney, Agent, or Firm* — Staas & Halsey

(57) ABSTRACT

A method and system for viral marketing is described. Using the method and system, recruiters may be associated with recruits. Recruiters may be compensated based on activities of recruits. The traceability of a recruit to a recruiter permits analysis of efficacy of the recruiter and recruitment techniques employed. The improved traceability is achieved due to the ability to trace any recruited user associated with an identifier of the recruiter.

14 Claims, 23 Drawing Sheets

U.S. PATENT DOCUMENTS

| | | |
|---|---|---|
| 2004/0006534 A1 | 1/2004 | Fung |
| 2004/0023644 A1 | 2/2004 | Montemer |
| 2004/0024752 A1 | 2/2004 | Manber et al. |
| 2004/0049541 A1 | 3/2004 | Swahn |
| 2004/0133469 A1 | 7/2004 | Chang |
| 2004/0143667 A1 | 7/2004 | Jerome |
| 2004/0203634 A1 | 10/2004 | Wang et al. |
| 2004/0243466 A1 | 12/2004 | Trzybinski et al. |
| 2005/0086290 A1 | 4/2005 | Joyce et al. |
| 2005/0096982 A1 | 5/2005 | Morton et al. |
| 2005/0105712 A1 | 5/2005 | Williams et al. |
| 2005/0114208 A1 | 5/2005 | Arbuckle et al. |
| 2005/0131866 A1 | 6/2005 | Badros |
| 2005/0136949 A1 | 6/2005 | Barnes, Jr. |
| 2005/0192000 A1 | 9/2005 | Lloyd |
| 2005/0210042 A1 | 9/2005 | Goedken |
| 2005/0289124 A1 | 12/2005 | Kaiser et al. |
| 2006/0010105 A1 | 1/2006 | Sarukkai et al. |
| 2006/0111974 A1 | 5/2006 | Nashed |
| 2006/0190327 A1 | 8/2006 | Jmaev |
| 2006/0242014 A1* | 10/2006 | Marshall et al. ............... 705/14 |
| 2006/0247981 A1 | 11/2006 | Singh et al. |
| 2006/0287916 A1 | 12/2006 | Starr et al. |
| 2007/0005344 A1 | 1/2007 | Sandor et al. |
| 2007/0061873 A1* | 3/2007 | Shewchuk et al. ............. 726/10 |

OTHER PUBLICATIONS

International Search Report issued Jan. 28, 2008 in PCT/US07/75369.

International Search Report issued Feb. 12, 2008 in PCT/US07/60467.

International Search Report issued Feb. 27, 2008 in PCT/US07/60459.

International Search Report issued Feb. 15, 2008 in PCT/US07/60468.

International Search Report issued Feb. 7, 2008 in PCT/US07/60472.

Carmel at al., "Searching XML Documents via XML Fragments," 2003, ACM, pp. 151-158.

Karat et al., "Patterns of Entry and Correction in Large Vocabulary Continuous Speech Recognition Systems," 1999, ACM, pp. 568-575.

Google Tutor, "Googling from your Mobile Phone-no Web Browser Needed!," 2005, Google Tour.

Varshney et al., "Voice Over IP," 2002, Communications of the ACM, vol. 45, No. 1, pp. 89-96.

Knoblock, Craig A., "Searching the World Wide Web," 1997, IEEE Expert, pp. 8-14.

Sullivan, Danny, "Google Launches Personalized Home Page," Search Engine Watch, May 2005.

International Search Report dated Jul. 11, 2008 for corresponding International Application No. PCT/US08/50499.

Amit Klein, Temporary user tracking in major browsers and Cross-domain information leakage and attacks, Sep.-Nov. 2008, pp. 1-50.

International Preliminary Examination Report dated Jul. 14, 2009, issued in corresponding PCT/US08/50499.

* cited by examiner

600

RECRUITER ACCOUNT RECORD

| | Description | Example Content |
|---|---|---|
| 605 | Recruiter account ID | 'Guide1000001_1' |
| 610 | Recruiter username | 'Guide1000001' |
| 615 | Verification code | 'getmoreusers' |
| 620 | Recruit list | 'user1000';'user1001';'user1003' |
| 625 | Invitation list | 'inviteuser1000';'inviteuser1001'; 'inviteuser1002';'inviteuser1003';'inviteuser1004' |
| 630 | Recruiter Information | '14450 Clay Terrace Blvd., Carmel, IN 46032';'Guide OneMillion' |
| 635 | Recruiter ID list | 'rid=13400';'rid=134001';'rid=134007';'rid=134008'; '13401x' |

FIG. 6

RECRUIT ACCOUNT RECORD

700

| | Description | Example Content |
|---|---|---|
| 705 | Recruit Account ID | 'user1001' |
| 710 | Recruit actions | 'default search';'homepage';'become recruiter' |
| 715 | Recruit activity | 'IPaddress=12.12.130.212','13October2006,12.19.12', sq='where is qatar','1222332'; 'IPaddress=12.12.130.212','13October2006,12.30.12', sq='who is john galt','1222332'; 'IPaddress=12.12.130.212','13October2006,12.30.15', select='ayn rand books','1222332' '13October2006,19.35.12', navigate='www.chacha.com','317.242.2422'; |
| 720 | Recruit identifier list | 'user1001','317.242.2422','AIMuser1001','1222332' |

*ChaCha·*
results

W-9 Application

Don't forget the government!

Bold & highlighted areas required

Personal Information — 1040 — 1042 — 1044
First Name* [......] M* b ] Last Name* [......]
Business Name [......] —1046
Check appropriate box: ○ Individual/Sole proprietor ○ Corporation ○ Partnership —1048
○ Other [......]
Address* [......] —1050
Apt/Suite [......] — 1052
City* [......] | State* [Kentucky] | Zip Code* [......]
    1054        1056             1058

PART 1 - Taxpayer Identification Number (TIN)
One or the other is required
Social Security Number [......] (no dashes) —1060
OR
Employer Identification number [......] (no dashes) —1062

Enter your TIN in the appropriate box. The TIN provided must match the name given on Line 1 to avoid backup withholding. For individuals, this is your social security number (SSN). However, for a resident alien, sole proprietor, or disregarded entity, see the Part I instructions on page 3. For other entities, it is your employer identification number (EIN). If you do not have a number, see How to get a TIN on page 3.

Note: If the account is in more than one name, see the chart on page 4 for guidelines on whose number to enter.

PART 2 - Certification

Under penalties of perjury, I certify that:

1. The number shown on this form is my correct taxpayer identification number (or I am waiting for a number to be issued to me), and
2. I am not subject to backup withholding because: (a) I am exempt from backup withholding, or (b) I have not been notified by the Internal Revenue Service (IRS) that I am subject to backup withholding as a result of a failure to report all interest or dividends, or (c) the IRS has notified me that I am no longer subject to backup withholding, and

Purpose of Form

A person who is required to file an information return with the IRS, must obtain your correct taxpayer identification number (TIN) to report, for example, income paid to you, real estate transactions, mortgage interest you paid, acquisition or abandonment of secured property, cancellation of debt, or contributions you made to an IRA.

to be issued),

Part I. Taxpayer Identification Number (TIN)

Enter your TIN in the appropriate box. If you are a resident alien and you do

Part II. Certification

To establish to the withholding agent that you are a U.S. person, or resident alien, sign Form W-9. You may be requested to sign by the withholding agent even if

What Name and Number to Give the Requester

For this type of account:          Give name and SSN of:
1. Individual                       The individual
2. Two or more individuals (joint   The actual owner of the
   (Uniform Gift to Minors Act)

Privacy Act Notice

Section 6109 of the Internal Revenue Code requires you to provide your correct TIN to persons who must file information returns with the IRS to report interest, dividends, and certain other income paid to you, mortgage interest you paid, the acquisition or abandonment of secured property, cancellation of debt, or contributions you made to an IRA, or Archer MSA or HSA. The IRS uses the numbers for identification purposes and to help verify the accuracy of your tax return. The IRS may also provide this information to the Department of Justice for

[Process Form] — 1035

Progress tracker

Part 1:
✓ Initial Sign Up Page Module
✓ TOS Page Module
✓ Introduction and Overview Page
✓ Introduction Video Module
Part 2:
✓ Tool Installation
✓ Problem Solving Test
✓ Typing Assessment
✓ Search Competency Test
Part 3:
✓ Summary Page Module
W9 Page Module
Handbook and Final Instruction Page Module 1005, 1010, 1015, 1020, 1025, 1030

ChaCha AGENT — 1305

My Account

[ Account | Dashboard | Earnings ]

Account Information — 1310

- User Name: Guide1000001 — 1312
- Email: guide1000000@chacha.com — 1314
- Change Password — 1316

Personal Information — 1315

- First Name: Guide — 1320
- Middle Initial: — 1322
- Last Name: OneMillion — 1324
- Gender: Male — 1326
- Phone Number: 317.242.24 — 1328
- Address: 14450 Clay Terrace Blvd. — 1330
- Address (cont.): — 1332
- City: Carmel
- State: Indiana — 1334
- Postal Code: 46032 — 1336

[ Update Account ] — 1340

1105 — Guide1000001 | My Account | Logout — 1115
http://try.chacha.com/?rid=134009 — 1135
Your unique referral url

1110

1300

Copyright © 2007 ChaCha Search, Inc.

METHOD AND SYSTEM FOR PROMOTION OF A SEARCH SERVICE

CROSS-REFERENCE TO RELATED APPLICATIONS

This application is related to and claims the benefit of U.S. Provisional Application Ser. No. 60/883,925, entitled, "CHACHA SOCIAL MARKETING INCENTIVE SYSTEM OVERVIEW", by Scott A. Jones, et al., filed Jan. 8, 2007 and is related to U.S. patent application Ser. No. 11/835,080 entitled, "METHOD, SYSTEM, AND COMPUTER PROGRAM PRODUCT FOR MULTI-LEVEL MARKETING", by Scott A. Jones, filed Aug. 7, 2007, in the United States Patent and Trademark Office, the disclosures of both of which are incorporated herein by reference.

BACKGROUND

1. Field

The present invention is related to search engine technologies including human-assisted search engines and, more particularly, to method and system for viral marketing of a search service.

2. Description of the Related Art

Viral marketing techniques have become a popular method for marketing products. The systems work on the ability to give away a service such as email (hotmail or Gmail for example) in order to generate a user base. Viral marketing works on a few simple principles. There must be an easy way to tell others about the service. The service must be able to scale rapidly to accommodate user growth. People must have a basic motivation to spread the service, such as socializing, or being popular due to being the first kid to find the cool new band, etc. It must utilize existing communication resources such as email, blogs, IM, telephone mail, etc. so that the message passes rapidly to large numbers of people. Lastly, it should utilize resources which are outside the perimeter of the service itself.

Such techniques have propagated many types of services. Popular sites such as YouTube™, Facebook® and products like Adobe® Acrobat®, or the Netscape® Navigator internet browser were enabled by viral marketing techniques. However, such systems do not attempt to provide a 'genomic path' wherein the person who recruits a user can be recognized for the person's recruitment effort. Likewise, there is no metric to determine which methods of getting the word out were most effective since any user looks just like every other user.

Marketing methods which provide traceability of recruitment allow recruitment efforts to be recognized and compensated. In addition, the effects of marketing campaigns can be measured. However, such techniques have not been applied to viral marketing.

In light of the above and other problems there is a need for a method and system for traceable viral marketing.

SUMMARY

A method and system for providing traceable viral marketing is disclosed. The system may assign a unique identifier to a recruiter and provide information associated with the identifier to the recruiter. The system may receive a request from a user including information associated with a recruiter.

The system may assign a unique identifier to a user, associate the user identifier with a recruiter and provide information to a user system which may allow search requests from a user system to be associated with the user identifier. Actions of a user(s) associated with a recruiter may be traced to determine compensation for a recruiter.

A system embodiment, methods, data structures and interfaces for operating the embodiments are disclosed.

BRIEF DESCRIPTION OF THE DRAWINGS

Aspects and advantages of the invention will become apparent and more readily appreciated from the following description of the embodiments, taken in conjunction with the accompanying drawings, of which:

FIG. 6 illustrates a database record.
FIG. 7 illustrates a database record.
FIG. 8 illustrates a graphical user interface (GUI).
FIG. 10 illustrates a GUI.
FIG. 13 illustrates a GUI.

DETAILED DESCRIPTION OF THE PREFERRED EMBODIMENTS

Figure 1:
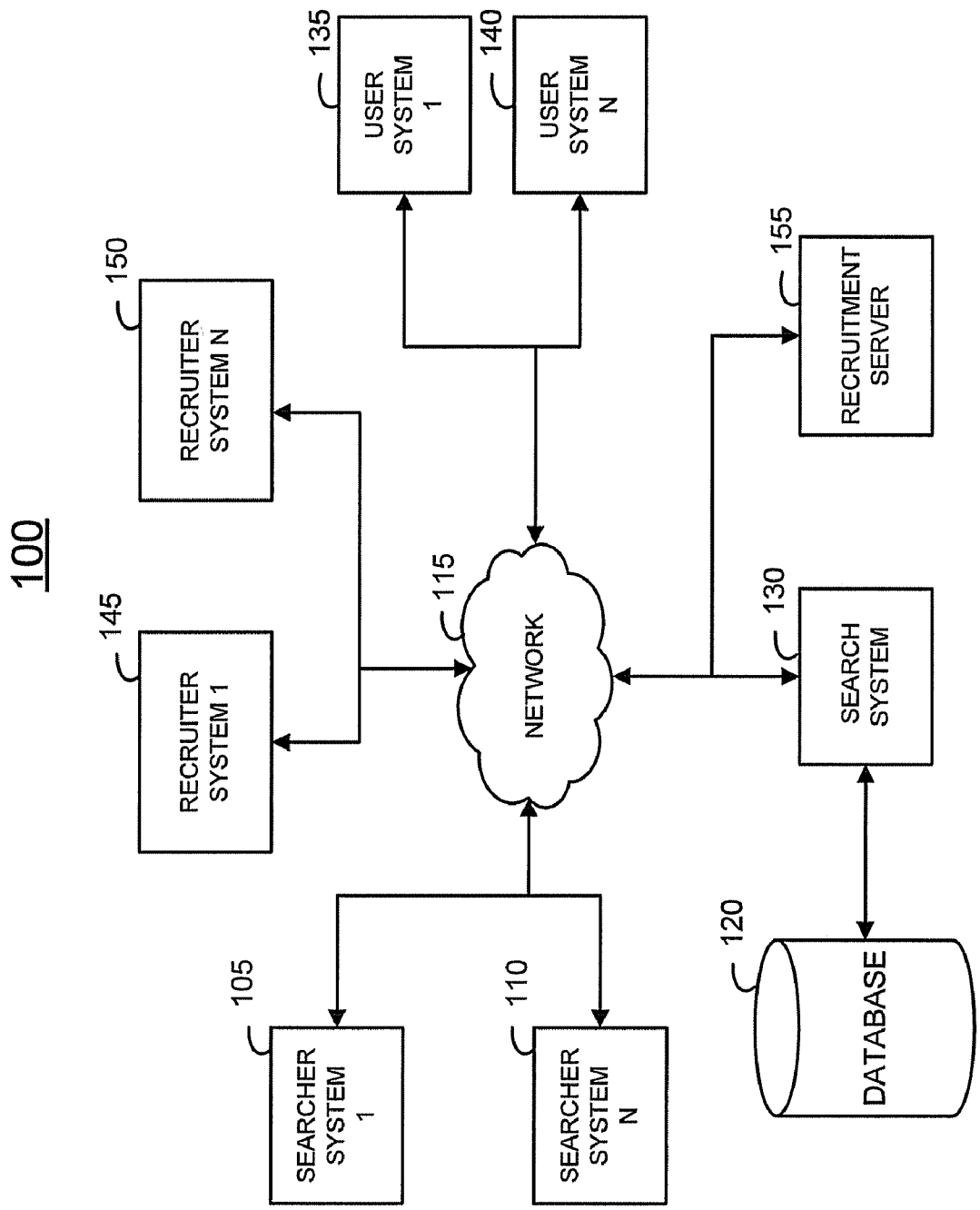
FIG. 1 is a block diagram of a system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

A recruiter registers with the system, and a unique identifier is assigned to the recruiter. A recruiter may be required to supply identifying information to the system so that compensation or recognition may be awarded. A recruiter is then provided with one or more URLs or other information which may be used by recruited users to download an extension or applet such as a toolbar, or other information from a recruitment server. The information provided to a recruiter includes a unique identifier of the recruiter in order that a user who is referred to the system by the recruiter may be recognized.

If a user follows a URL provided by a recruiter by for example, clicking on a link in an email, or activating a link on a blog, or entering a link in a browser, the user is provided with an opportunity to download an installation driver which creates an applet or extension such as a toolbar. When the installation is complete, the toolbar or other extension includes a unique identifier which is associated with the applet or toolbar. If a user subsequently submits a request to a server using the application extension, information of the recruiter and the user may be included in the request. Using an identifier of the user and an identifier of the recruiter, traceability of the activity of the user and the recruiter may be obtained.

A user may take one or more actions such as selecting a browser homepage, adding a search engine to a search appliance of a browser, or registering with a search system which are traceable to an identifier of a recruiter. In such cases, an identifier(s) of a user may be included in a message delivered to a search system. If an identifier(s) of a user are associated with one or more identifiers of a recruiter, the recruiter may be compensated for an activity(ies) of a recruited user.

As illustrated in FIG. 1, system 100 may include searcher system(s) 105, 110, a network 115 such as the Internet, a search system 130, user system(s) or information seeker computer system(s) 135, 140, a database 120, which may comprise various records, recruiter system(s) 145, 150, and a recruitment server 155.

Each of the searcher computer systems, that is, the searcher systems 105, 110 can be operated by a human searcher to obtain search results for an information seeker located at user systems (e.g., the information seeker computer systems 135, 140). The recruiter systems 145, 150 may be operated by a person or entity who may provide recruitment services. While only a limited number of searcher (also referred to as a human searcher), recruiter (also referred to as an agent) and information seeker (also referred to as a user or requester) computer systems are depicted in FIG. 1, it is within the scope of the disclosure for multiple searcher, recruiter and information seeker computer systems to be utilized.

The network 115 (FIG. 1) may be a global public network of networks (the Internet) and/or consist in whole or in part of one or more private networks and communicatively couples the searcher computer systems, the recruiter systems and user computer systems with the other components of the system 100 such as the search system 130, the database 120, and the recruitment server 155.

The search system 130 allows interaction to occur between the searcher systems 105, 110, the recruiter systems 145, 150 and the information seeker computer systems 135, 140. For example, an information search query(ies) can be transmitted from the information seeker computer systems 135, 140 to the search system 130, where a query(ies) can be accessed by the searcher systems 105, 110 and/or the recruiter systems 145, 150. Similarly, a search result(s) produced using the searcher systems 105, 110 or the recruiter systems 145, 150 in response to a search query(ies) produced by the information seeker computer systems 135, 140 may be transmitted to the search system 130, where it may be stored by the search system 130 and may be transmitted to the information seeker computer systems 135, 140 and/or the recruiter systems 145, 150.

The recruitment server 155 provides web pages, information and software required to enable recruitment of users which may be traced to a recruiter. The recruitment server 155 may be a stand alone system, or may be included in whole or in part within the search system 130 or any other viable computer system accessible via the network 115. The recruitment server 155 is communicatively coupled with the search system 130 and the database 120 via the network 115. The database 120 may consist of one or more suitable systems which allow access to the records utilized in operating the embodiments.

The information seeker computer systems 135, 140 may include within the scope of the disclosure, any device through which an information seeker can submit a query or search query or search request to and/or receive information or search result(s) from the search system 130. In one embodiment, the information seeker computer system 135 may be a device configured for connection to a network and may run web browser software. Thus, the information seeker computer system 135 (user systems 135, 140 in FIG. 1) may be a laptop, personal data assistant (PDA), desktop PC or Mac®, a workstation or terminal connected to a mainframe, a specialized search apparatus, or a smart phone, etc. within the scope of the disclosure. Additionally, as disclosed in U.S. application Ser. No. 11/647,437 entitled, "TARGETED MOBILE DEVICE ADVERTISEMENTS", filed on Dec. 29, 2006, by Scott A. Jones, et al. and incorporated by reference herein, the search system 130 may include a gateway for voice communication and a speech-to-text system or other transcription device or personnel to facilitate access to the search system via voice communications such as through a landline phone, cellular phone, voice over Internet protocol or other telephonic device. Such devices may also be used as the user system or information seeker computer systems 135, 140 within the scope of the disclosure. Likewise, a searcher system such as the searcher system 105 may be voice-enabled and/or may employ text-to-speech and/or speech-to-text capabilities. A searcher system may be a landline phone, cellular phone, a voice-enabled laptop or desktop computer, a smart phone, or other telephonic device. A recruiter system such as the recruiter system 145 may also be a desktop, laptop, PDA, smart phone, cellular phone, landline phone or any other device which can receive and send information using the network 115.

The search system 130 is communicatively coupled with the database 120. As will be described herein in further detail below, the database 120 includes data that is processed during operation of the embodiments.

After being presented with the disclosure herein, one of ordinary skill in the art will readily appreciate that the computer systems of the embodiments can be any type of viable systems known in the art.

In the disclosed system and method, a recruiter is required to register with the search system 130. A recruiter may be required to provide information to the search system 130 in order to establish an account with the search system whereby the recruiter may be recognized and compensated for recruitment activities. A recruiter may be a searcher or guide who is registered with the search system 130, or may be a person or entity who has registered with the search system 130. A recruiter may begin a registration process by being directed to a web page such as the GUI 800 illustrated in FIG. 8. The recruiter may be directed to the GUI 800 using techniques such as those described herein.

Figure 2:
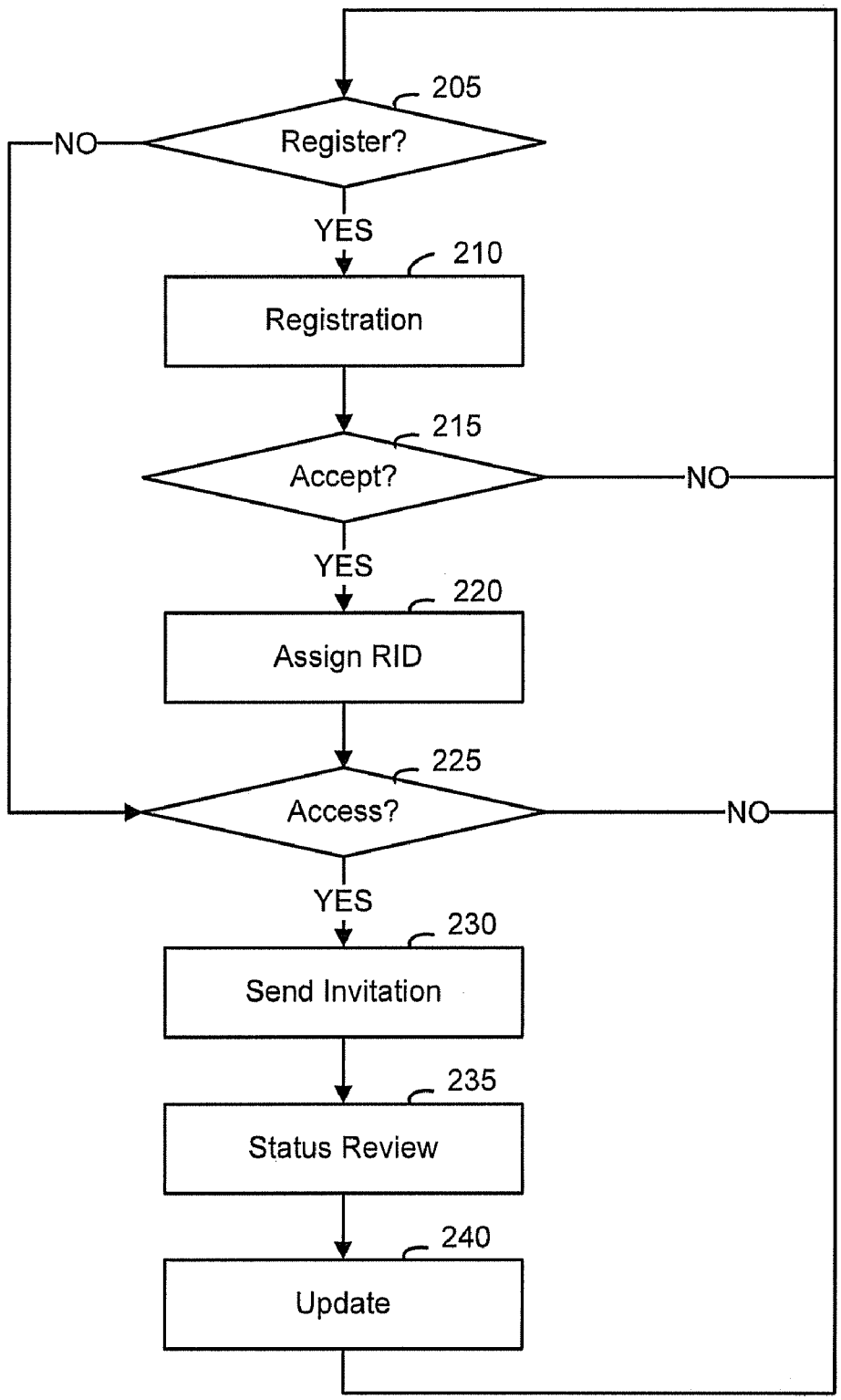
FIG. 2 illustrates a flow diagram of a method of operation.

As illustrated in FIG. 2, a process 200 for registering and utilizing a recruiter is provided.

In operation 205 (FIG. 2) a determination is made as to whether a request to register as a recruiter is received. If it is determined in operation 205 that a request to register as a recruiter is not received, control is passed to operation 225 and process 200 continues. If it is determined in operation 205 that a request to register as a recruiter is received, control is passed to operation 210 and process 200 continues.

In operation 210 a registration process is performed. A prospective recruiter may be presented with a registration GUI such as the recruiter registration GUI 900 illustrated in FIG. 9. Control is passed to operation 215 and process 200 continues.

In operation 215 a determination is made as to whether a recruiter registration is accepted. If in operation 215 it is determined that a recruiter registration is not accepted, control is passed to operation 205 and process 200 continues. If in operation 215 it is determined that a recruiter registration is accepted, control is passed to operation 220 and process 200 continues.

A recruiter registration process may require any type of information determined to be necessary for registration to be completed. For example, a recruiter may be required to accept a terms of service and provide tax and/or payment information to the provider of the search system 130. In at least one embodiment, a registered guide may be offered the opportunity to act as a recruiter.

In operation 220 a unique identifier is assigned to a recruiter. The unique identifier may be utilized in order to trace recruitment activities by a recruiter as will be described further herein below. Control is passed to operation 225 and process 200 continues.

In operation 225 a determination is made as to whether a request for access to a recruiter account is received. If in operation 225 it is determined that a request for access to a recruiter account is not received, control is passed to operation 205 and process 200 continues. If in operation 225 it is determined that a request for access to a recruiter account is received, control is passed to operation 230 and process 200 continues.

The determination in operation 225 may be made based on various criteria. In at least one embodiment, a username or other identifier of a recruiter is obtained, and verification information is provided. For example, a recruiter may access a web page of the recruitment server 155 and provide a username and password. In at least one embodiment, a telephone number associated with a recruiter is obtained, and a password is entered using a numeric keypad. Any form of recruiter authentication known in the art may be utilized within the scope of the embodiments.

In operation 230 a recruiter sends invitations to a potential recruit(s). For example, a recruiter may send invitations using email, using a blog posting, by distributing printed media such as business cards, by sending a voice or text message, or by any other mechanism which can provide an identifier of the recruiter to the recruit. Control is passed to operation 235 and process 200 continues.

In operation 235 a recruiter may review the status of recruitment efforts and compensation awarded for recruitment activities. For example, a recruiter may be presented with a GUI such as the recruiter dashboard GUI 1400 illustrated in FIG. 14. A recruiter may review any information indicated in the database 120 (FIG. 1) which is accessible to the recruiter. Control is passed to operation 240 and process 200 continues.

In operation 240 the database 120 (FIG. 1) is updated to reflect activities by a recruiter. For example, a list of invitations may be updated, account information may be updated, or any other information associated with a recruiter may be modified and recorded. Control is passed to operation 205 and process 200 continues.

Figure 3:
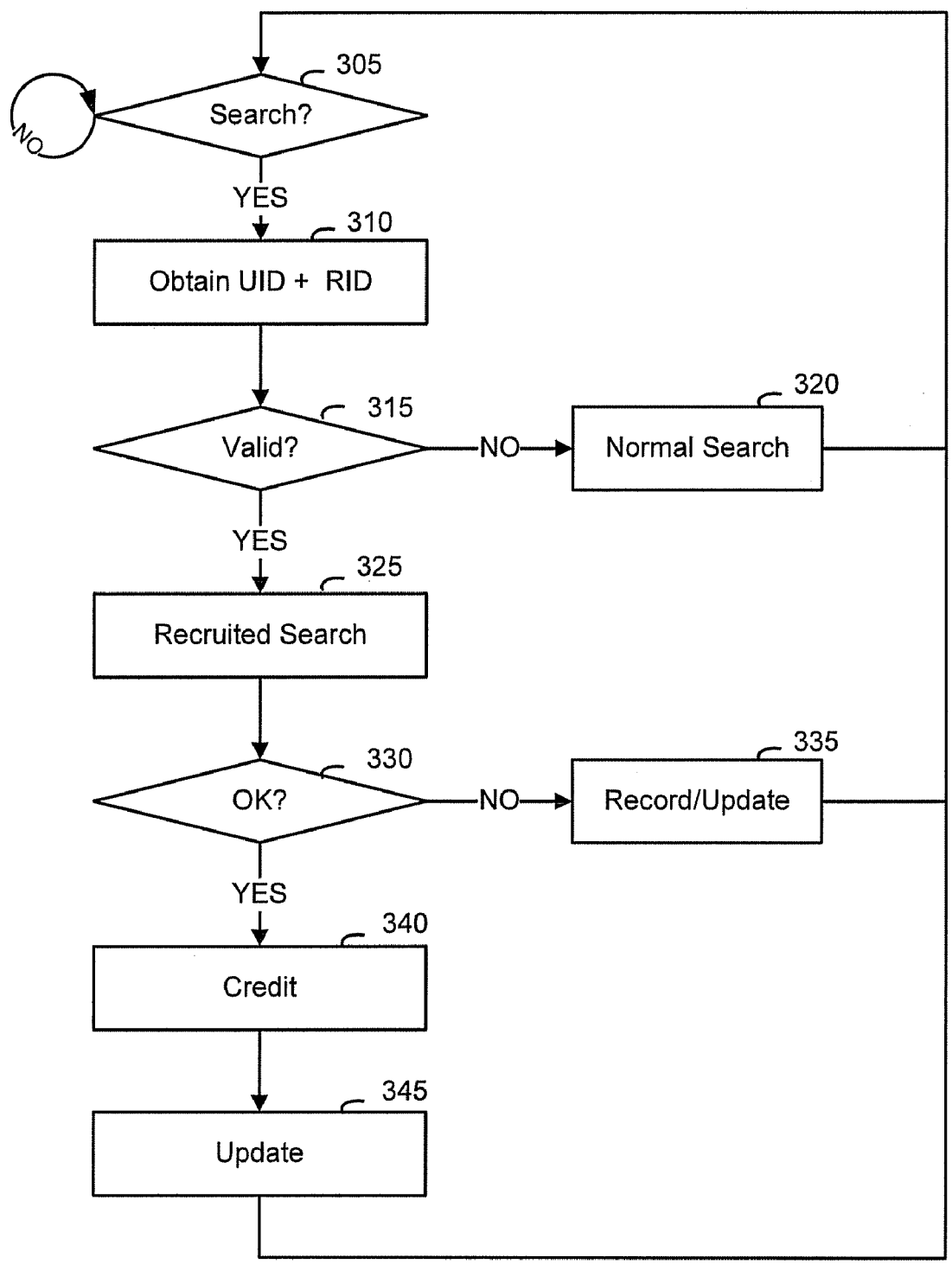
FIG. 3 illustrates a flow diagram of a method of operation.

As illustrated in FIG. 3, a process 300 for processing a search request and compensating a recruiter is provided. The process 300 may be operative on the search system 130 (FIG. 1).

In operation 305 (FIG. 3) a determination is made as to whether a search request is received. If it is determined in operation 305 that a search request is not received, control remains at operation 305 and process 300 continues to wait. If it is determined in operation 305 that a search request is received, control is passed to operation 310 and process 300 continues.

In operation 310, a user identifier (UID) and a recruiter identifier (RID) are obtained from a search request. In at least one embodiment, the UID and the RID are received as part of a URL which is received from a user system such as the user system 135 (FIG. 1). A UID and a RID may be encrypted and may be based on a random number, may include a one-time use token, and/or other security measures. Other information associated with a search request may be obtained. For example, a persistent 'cookie', a username, an IP address, a telephone number, an IM credential, an email address, and/or other information associated with a search request and/or a user system may be obtained. Any information associated with a search request may be utilized to determine an identifier of a user and/or an identifier of a recruiter. Control is passed to operation 315 and process 300 continues.

In operation 315 a determination is made as to whether a user ID and/or a recruiter ID are valid. If in operation 315 it is determined that a user ID and/or a recruiter ID are not valid, control is passed to operation 320 and process 300 continues. If in operation 315 it is determined that a user ID and/or a recruiter ID are valid, control is passed to operation 325 and process 300 continues.

The determination in operation 315 may be based on various criteria. In at least one embodiment, the recruiter ID and the user ID are compared to information stored in the database 120 (FIG. 1) and if the user ID matches a user ID stored in the database, and/or the recruiter ID matches information included in the database, the UID and the RID are determined to be valid. In at least one embodiment, a UID and/or an RID may be determined to be invalid based on information associated with a UID or RID recorded in the database 120. For example, a RID may be identified as being invalid if a recruiter has been determined to be ineligible to receive compensation. A UID may be determined to be invalid if activity (ies) associated with a UID meet criteria determined by the search system 130. For example, if identical search requests are received associated with a UID which are separated by a short time interval (e.g., 3 seconds), or if search requests associated with a UID are received within a short time interval (e.g., 10 seconds) which originate from different IP addresses the UID may be determined to be invalid. Various criteria may be utilized to determine if a UID and/or a RID are valid. In at least one embodiment, a web page associated with a search may include an identifier of a recruiter associated with a RID obtained in operation 310 and a user may be requested to verify that the recruiter is associated with the user on a first and/or subsequent usage of the search system 130.

In operation 320 an information search is performed. A user is provided with a search result(s). Information associated with a search request, a UID, a RID, and a search result(s) are associated and may be recorded in the database 120 (FIG. 1). Although a UID and/or RID are invalid, activities associated with the UID and/or RID may be recorded. The database 120 is updated. Control is passed to operation 305 and process 300 continues.

In operation 325 an information search is performed. Information of activity(ies) by a user associated with a UID and RID may be recorded. For example, links activated, time spent viewing a search result(s), a response(s) to an advertisement(s), a response(s) to a message(s), etc. may be stored in the database 120 (FIG. 1) associated with a UID and/or RID. Such information may be utilized to determine compensation, rating(s) and/or ranking(s) for a recruiter associated with a RID. Control is passed to operation 330 and process 300 continues.

In operation 330 a determination is made as to whether a user activity is valid. If in operation 330 it is determined that a user activity is not valid, control is passed to operation 335 and process 300 continues. If in operation 330 it is determined that a user activity is valid, control is passed to operation 340 and process 300 continues.

The determination in operation 330 may be made based on various criteria. For example, if a user spent more than a specific time interval (e.g., 20 seconds) at a web page a user activity may be determined to be valid. Using a different example, a user may be required to take one or more actions such as activating a link, an advertisement, and/or other action which may be used to determine if a user activity is valid. A determination of validity may be made based on any information indicated in the database 120 (FIG. 1), and/or accessible to the search system 130.

In operation 335 activity(ies) associated with a UID and a RID are associated with the UID and the RID and information of the association is recorded in the database 120 (FIG. 1). Activity may be recorded which may be analyzed to determine if compensation, recognition, ranking(s), rating(s), and other information associated with a RID is to be modified. A user activity associated with a UID and RID may affect the eligibility of a recruiter to recruit users, to receive compensation, etc. For example, activity such as a large number of requests in a short period of time associated with a user ID may be determined to be invalid in operation 330. If multiple users recruited by a recruiter show such behavior, a recruiter may be suspended from recruitment activities, or system administrators may be alerted. The database 120 (FIG. 1) is updated. Control is passed to operation 305 and process 300 continues.

In operation 340 activity(ies) associated with a UID and a RID are used to credit an account associated with a RID with some form of compensation. For example, if a number of searches associated with a UID exceeds threshold, a recruiter associated with the RID may be eligible to receive compensation. Such a user can be referred to as a 'consistent user' of a service. If activity associated with a user ID includes activating a link, an advertisement, or use or purchase of a service and/or product, a recruiter associated with the RID may be eligible to receive compensation of some type. A set of business rules may be applied to determine compensation of a recruiter associated with a RID. In at least one embodiment, compensation of a recruiter is based on the number of users recruited and the number of searches performed by recruited users. For example, for any user recruited by a recruiter who performs more than 20 searches in a 30 day period, a recruiter may receive compensation. In at least one embodiment, compensation for a recruiter is based on a comparison of the recruiter's total number of recruited consistent users to the total number of recruited consistent users for other recruiters in a given time period. Control is passed to operation 345 and process 300 continues.

In operation 345 information associated with credits for a recruiter, search result(s), search request(s), and/or other activity(ies) associated with a user and/or a recruiter are recorded in the database 120 (FIG. 1). Control is passed to operation 305 and process 300 continues.

Figure 4:
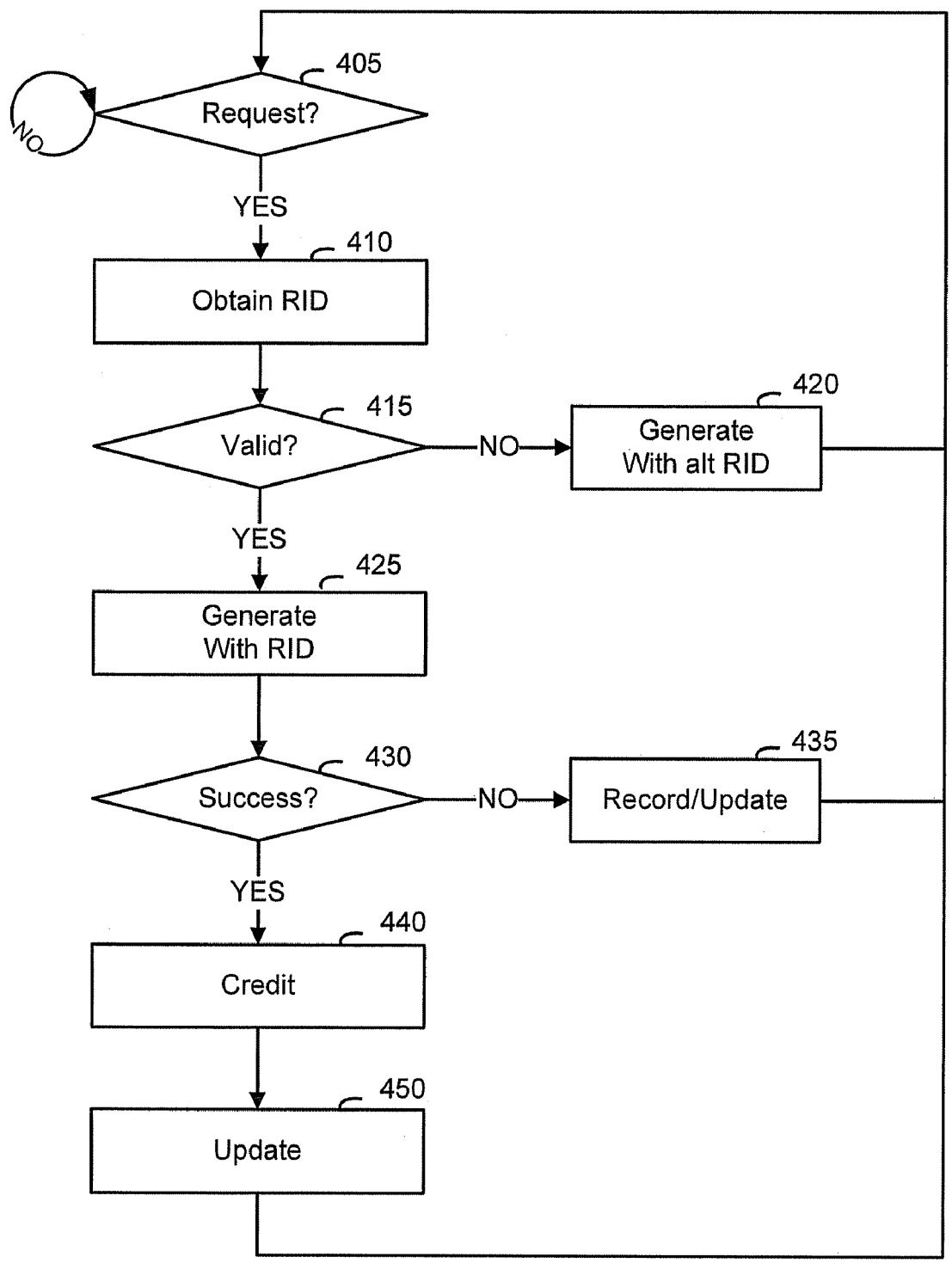
FIG. 4 illustrates a flow diagram of a method of operation.

As illustrated in FIG. 4, a process 400 for providing an extension or other information to a user system in order to associate a recruiter identifier (RID) and a user identifier (UID) with a user is provided. The process 400 may be operative on the recruitment server 155 (FIG. 1).

In operation 405 (FIG. 4) a determination is made as to whether a request for a UID and/or associated software is received. If it is determined in operation 405 that a request for a UID and/or associated software is not received, control remains at operation 405 and process 400 continues to wait. If it is determined in operation 405 that a request for a UID and/or associated software is received, control is passed to operation 410 and process 400 continues.

In operation 410, a recruiter identifier (RID) is obtained from a request received in operation 405. In at least one embodiment, the RID is received as part of a URL which is received from a user system such as the user system 135 (FIG. 1). A RID may be encrypted and may be based on a random number, may include a one-time use token, and/or other security measures. Other information associated with a request may be obtained. For example, a persistent 'cookie', a username, an IP address, a telephone number, an IM credential, an email address, and/or other information associated with a request and/or a user system may be obtained. Alternately, a RID may be obtained from the database 120 based on information indicated in a request received in operation 405. For example, the request received may include information which is used to 'look up' a RID in the database 120 while not containing information of the RID itself. Control is passed to operation 415 and process 400 continues.

In operation 415 a determination is made as to whether a recruiter ID is valid. If in operation 415 it is determined that a recruiter ID is not valid, control is passed to operation 420 and process 400 continues. If in operation 415 it is determined that a recruiter ID is valid, control is passed to operation 425 and process 400 continues.

The determination in operation 415 may be based on various criteria. In at least one embodiment, the recruiter ID is compared to information stored in the database 120 (FIG. 1) and if the recruiter ID matches information included in the database 120, the RID is determined to be valid. In at least one embodiment, a RID may be determined to be invalid based on information associated with a UID and/or RID recorded in the database 120 (FIG. 1). For example, a RID may be determined to be invalid if a recruiter is ineligible to receive compensation. A RID may be determined to be invalid if activity (ies) associated with a RID meet criteria determined by the search system 130. For example, if a number of UID's associated with an RID are found to be conducting particular activity(ies), or if activity associated with a RID indicates prohibited marketing techniques or if a RID has been inactive for a period of time an RID may be determined to be invalid. In at least one embodiment, a user who has submitted the request in operation 405 may be presented with an identifier of the recruiter associated with the RID and required to validate the identity of the recruiter.

In operation 420 an action associated with a request submitted in operation 405 is performed. For example, a browser landing page URL may be modified, or a search engine may be added to a list of default search engines in a browser search appliance, or an installation application for a toolbar or other extension may be downloaded to a user system such as the user system 135 (FIG. 1). As a RID was determined to be invalid in operation 415, the action may include a modified (alternate) RID which indicates that the RID was invalid, but may contain a UID in order that future activity of a recruited user is traceable, and that a recruiter may be compensated should the RID later be determined to be valid. For example, if a recruiter associated with a RID has been suspended, and is later reinstated, the modified RID may allow the search system 130 to determine if a recruiter is eligible to receive compensation based on activities of users associated with the modified RID. The database 120 is updated. Control is passed to operation 405 and process 400 continues.

In operation 425 an action associated with a request submitted in operation 405 is performed. For example, a browser landing page may be modified, or a search engine may be added to a list of default search engines, or an installation application for a toolbar or other extension may be downloaded to a user system such as the user system 135 (FIG. 1). As the RID was determined to be valid, the activity includes the RID which was valid, and contains a UID in order that future activity of a recruited user is traceable to the RID. Examples of actions which may be performed are further illustrated herein below with respect to FIG. 16 through 23. The database 120 (FIG. 1) is updated. Control is passed to operation 430 and process 400 continues.

In operation 430 a determination is made as to whether an action performed in operation 425 was completed successfully. If in operation 430 it is determined that an action performed in operation 425 was not completed successfully, control is passed to operation 435 and process 400 continues. If in operation 430 it is determined an action performed in operation 425 was completed successfully, control is passed to operation 440 and process 400 continues.

The determination in operation 430 may be made based on various criteria. For example, a confirmation message may be received from a user system such as the user system 135 (FIG. 1) in order to determine if an action was completed successfully. In at least one embodiment, the determination may be made based on a first receipt of a search request associated with a user ID and/or RID associated with the action performed in operation 425. A determination of successful completion may be made based on any information indicated in the database 120 (FIG. 1), and/or accessible to the search system 130.

In operation 435 actions associated with a UID and a RID are associated with the UID and the RID and information of the association is recorded in the database 120 (FIG. 1). Activity may be recorded which may be analyzed to determine if compensation, recognition, ranking(s), rating(s), and other information associated with a RID is to be modified. For example, a download of software or other action associated with a UID and RID may affect the eligibility of a recruiter to recruit users, to receive compensation, etc. If an action was attempted in operation 425, but not completed successfully, a recruiter and/or a user may be notified and may be instructed as to how the action may be completed successfully. For example, if a recruited user or recruit downloads a toolbar installer, but no acknowledgement indicating a successful completion of the installation is received by the recruitment server 155 (FIG. 1) a notification can be sent to the recruiter that a recruit may require assistance. In another example, a recruit may already have set the recruit's homepage to a URL associated with a first recruiter, in which case an equivalent action in operation 425 is not successful for a second recruiter. The information regarding the user may be recorded in the database 120 and/or sent to the second recruiter in order to avoid repeated recruitment efforts for that user. The database 120 is updated. Control is passed to operation 405 and process 400 continues.

In operation 440 activity(ies) associated with a UID and a RID may be presented to a recruiter. For example, if a user has performed one or more actions associated with a RID, the recruiter may be informed of the type of action, the invitation method associated with a recruited user and/or other information regarding a recruited user which has been obtained by the recruitment server 155 (FIG. 1) and/or the search system 130. A GUI such as the recruiter dashboard GUI 1400 illustrated in FIG. 14 may be presented to a recruiter. A recruiter may be compensated, and/or may be allowed to perform an activity based on the determination made in operation 430. For example, a recruiter may become eligible to invite a larger number of users based on successful recruitment of a number of users. A recruiter may be credited with 'points' or other consideration based on successful completion of an action by a recruited user. Control is passed to operation 450 and process 400 continues.

In operation 450 information associated with credits for a recruiter, search result(s), search request(s), and/or other activity(ies) associated with a user(s) and/or a recruiter are recorded. The database 120 (FIG. 1) is updated. Control is passed to operation 405 and process 400 continues.

Figure 5:
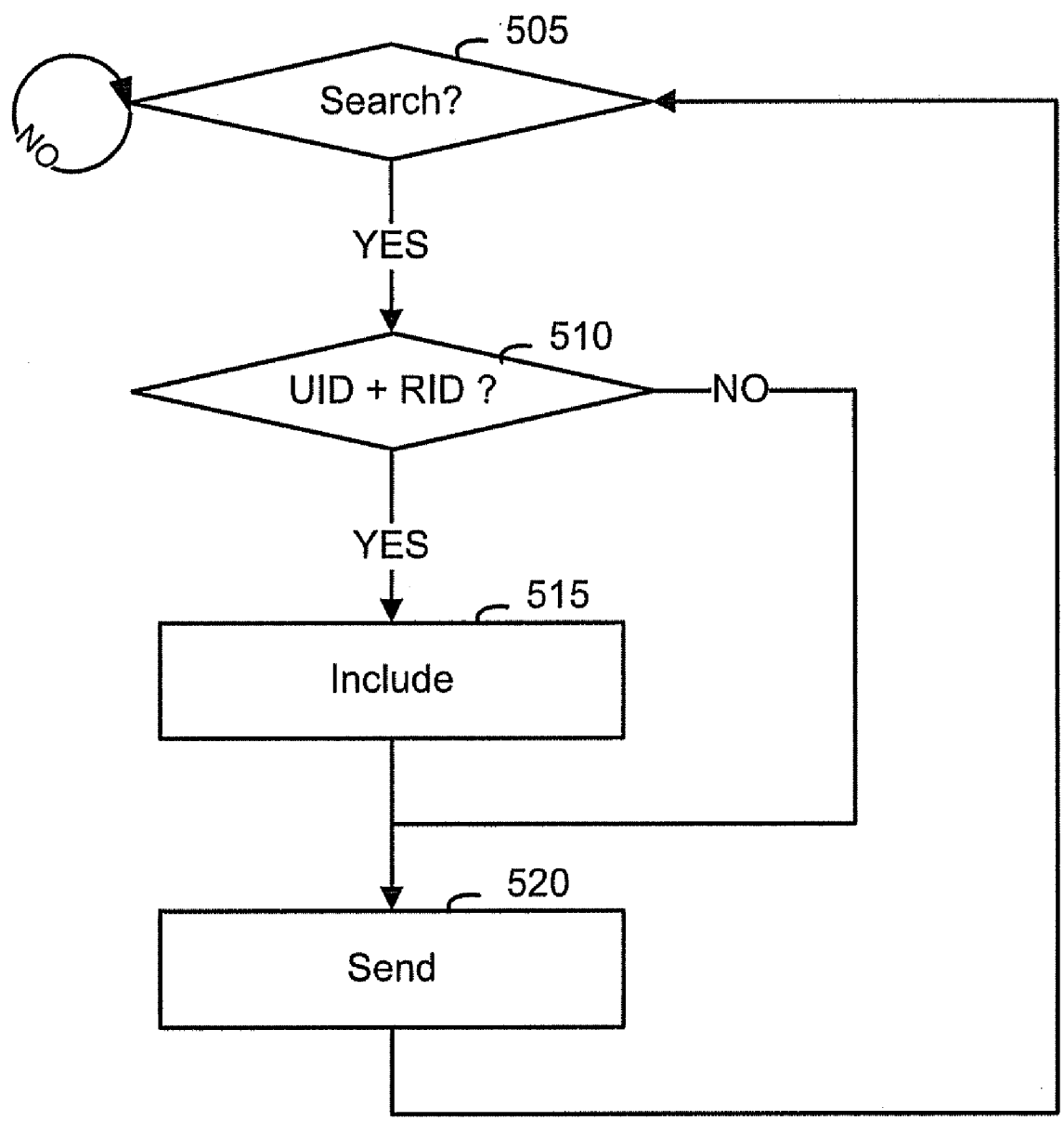
FIG. 5 illustrates a flow diagram of a method of operation.

As illustrated in FIG. 5, a process 500 for sending a request associated with a recruiter identifier (RID) and a user identifier (UID) associated with a user is provided. The process 500 may be operative on a user system such as the user system 135 (FIG. 1).

In operation 505 (FIG. 5) a determination is made as to whether a request is to be submitted. If it is determined in operation 505 that a request is not to be submitted, control remains at operation 505 and process 500 continues to wait. If it is determined in operation 505 that a request is to be submitted, control is passed to operation 510 and process 500 continues.

In operation 510, a determination is made as to whether a UID and/or a RID is present. If in operation 510 it is determined that a UID and/or RID is not present, control is passed to operation 520 and process 500 continues. If in operation 510 it is determined that a UID and/or RID is present, control is passed to operation 515 and process 500 continues.

The determination in operation 510 may be made based on various criteria. The user system 135 (FIG. 1) may determine whether a UID and/or RID are present based on information of a homepage stored in a browser application, based on information provided in a search tool in a browser, based on information available to a toolbar or other extension, etc. In at least one embodiment, a message sent from the search system 130 and/or the recruitment server 155 may modify and/or delete information of a UID and/or RID.

In operation 515 information of a UID and/or RID is included in a message to be transmitted. The included information is based on the UID and/or RID identified in operation 510. Various forms of encryption may be used, and the UID and/or RID may not be explicitly included in a message. Control is passed to operation 520 and process 500 continues.

In operation 520 a message is transmitted to a server such as the recruitment server 155 (FIG. 1) and/or a server of the search system 130. Control is passed to operation 505 and process 500 continues.

The message transmitted in operation 520 may be a search request, a request for information or software, or any other message which may include the UID and/or RID information.

As illustrated in FIG. 6, a sample of a recruiter account record, of which one or more may be associated with or resident in the database 120 (FIG. 1), may include a recruiter account identification (ID) field 605, a recruiter username filed 610, a verification code field 615, a recruit list field 620, an invitation list field 625, a recruiter information field 630, and a recruiter ID list field 635.

A recruiter account record may be created in various ways. In at least one embodiment, a recruiter account record is created when a recruiter registers with the search system 130 (FIG. 1). Information required to register as a recruiter is further described herein below. A recruiter may be a guide or searcher, and/or may be an individual or entity which may recruit users, but does not provide search services to users of the search system 130.

The recruiter account ID field 605 preferably contains a unique identifier of the recruiter, which is preferably used consistently. For example, in at least one embodiment, the recruiter account ID field 605 can include a randomly generated numerical code, and/or a text string indicating the content of a recruiter account record. A recruiter account ID serves to distinguish a recruiter account record associated with a recruiter from a recruiter account record associated with other recruiter(s). Although particular examples of identifiers are described herein, other types of identifiers uniquely indicating a recruiter may be utilized without departing from the spirit and scope of the embodiments.

A unique identifier is assigned to a recruiter account when the recruiter completes registration with the search system 130 (FIG. 1). As illustrated in FIG. 6, the string 'Guide1000001_1' is the recruiter ID associated with the recruiter account record 600 (FIG. 6).

The recruiter username field 610 includes information of a username associated with a recruiter account. The content of the recruiter username field 610 may be used to verify recruiter access privileges. Using the example in FIG. 6, 'Guide1000001' is the username associated with the recruiter account record 600.

The recruiter verification code field 615 includes a verification code for verifying that a recruiter is authorized to access recruiter information. A verification code may be a text string and/or numerical code that operate in conjunction with contents of the recruiter username field 610 to verify recruiter authorization(s). In at least one embodiment, a username entered by a recruiter is used to retrieve or "look-up" the verification code (password) to compare the verification code with a verification code entered by a recruiter. If both a username match occurs and a verification code match occurs, access to the recruiter account record data may be granted. Other forms of security information such as a fingerprint, voiceprint, etc. may be used within the scope of the embodiments herein. Using the example illustrated in FIG. 6, 'getmoreusers' is the verification code associated with the recruiter username 'Guide1000001' and the recruiter account record 600.

The recruit list 620 includes information of users who have been recruited by the recruiter associated with the recruiter account record 600. A recruit account ID or other identifier of a user recruited by a recruiter is included in the recruit list 620. Such information is utilized to associate a recruit with a recruiter in order that activity(ies) of a recruit may be tracked to determine compensation, ranking, rating, effectiveness of recruiting methods, etc. associated with a recruit and a recruiter.

The invitation list field 625 includes information of recruiting activities associated with a recruiter. When a recruiter delivers a recruitment message to a recruit, such information may be recorded. For example, when a recruiter prepares an email message for recruitment of one or more users, information regarding the content and intended recipient of the message may be recorded. This may include an email address associated with the message, a unique identifier which has been incorporated into a URL included in the email message, etc. Likewise, if a person activates a link on a blog which is provided by the recruiter, a counter or other identifier of that person may be recorded in order that future activities of that person may be traced. For example, when a user activates a link on a blog, the user may be directed to a web page of the recruitment server 155 (FIG. 1). As the URL in the blog contains an identifier of a recruiter, the recruitment server may record that a recruit was directed to the recruitment server 155 by a recruiter. The recruitment server 155 may create a unique ID for a recruit which includes information associated with the recruiter. Information associated with the recruit ID may be stored on a user computer system such as the user system 135 (FIG. 1) using a 'cookie' or other mechanism. Associated information of the recruiter and the user is stored in the database 120.

Alternate and/or additional identifiers of a recruit might be employed based on the mode of communication used to access the recruitment server 155 (FIG. 1) and/or the search system 130. For example, if a recruit accesses the recruitment server 155 via a voice or text message associated with a phone number which includes an identifier of the recruiter, the phone number may be utilized to identify a recruit, and content of the voice or text message may identify a recruiter. If a recruit accesses the recruitment server 155 via an email message associated with an email address which includes an identifier of the recruiter, the email address may be utilized to identify a recruit, and content of the email message may identify the recruiter. Other communication techniques such as instant messaging (IM), etc. might be used to access the recruitment 155 server and may provide an identifier of a recruit and a recruiter.

Information included in the invitation list field 625 (FIG. 6) may be examined in order to provide a recruiter and/or the search system 130 (FIG. 1) and/or the recruitment server 155 with information regarding status of the activities of a recruiter. For example, a recruiter may have a limited number of invitations available. In such a case, if the number of invitations indicated in the invitation list exceeds a value, the recruiter may be prevented from issuing further invitations. Likewise, the information in the invitation list field 625 (FIG. 6) and the recruit list field 620 may be compared to determine whether an invitation has been accepted. Using the example illustrated in FIG. 6, the recruiter 'Guide 1000001' has sent messages 'inviteuser1000', 'inviteuser1001', 'inviteuser1002', 'inviteuser1003', and 'inviteuser1004'. Such invitations might have been sent using an email messaging system, or via SMS or other text message, or might have been counted as 'hits' to a server, etc. Based on information indicated in the recruit list 620, the recruits 'user1000', 'user1001', and 'user1003' have accepted an invitation by taking action(s) which designate them as recruits. As the recruiter 'Guide1000001' has sent five invitations and three identified users have accepted, there are two outstanding invitations associated with 'inviteuser1002' and 'inviteuser1004'. As the recruiter may know how to contact the prospective recruit(s), the recruiter may use such information to determine if a follow-on contact might produce a recruit. Other types of analysis might be provided, such as percentage of invitations accepted, time interval between sending of an invitation and acceptance of the invitation, etc. Effectiveness of various forms of recruitment might be evaluated as each type of recruitment may have an identifier which is associated with the recruiter and the type of recruitment activity used, as will be explained further herein.

In at least one embodiment, information indicated in the invitation list field 625 indicates the recruiting method utilized to recruit a user(s). For example, 'inviteuser1000' might indicate that an invitation was sent to an instant message user, while 'inviteuser1002' might indicate that an invitation URL was posted on a recruiter blog, while 'inviteuser1003' might indicate that an invitation was posted on a different recruiter blog, while 'invite1004' might indicate that an invitation was placed on a recruiter website, etc.

The recruiter information field 630 may include information provided by a recruiter in order to register with the search system 130 (FIG. 1). Using the example illustrated in FIG. 6, a user address, name, etc. may be indicated in the recruiter information field. Such information may be used to provide compensation to a recruiter, to provide notification(s) to a recruiter, or for other purposes by the search system 130.

The recruiter ID list field 635 includes a list of identifiers which are associated with a recruiter. A recruiter may have multiple identifiers (ID's) associated with a recruiter. For example, a URL associated with a blog might have the identifier 'rid=13400', a URL associated with an email might have the identifier 'rid=134001', a URL associated with a second email might have the identifier 'rid=134007', a website URL might be associated with the identifier 'rid=134008', and a recruiter device might be associated with the identifier '13401x' as illustrated in FIG. 6. As a recruiter might utilize various techniques of distributing information associated with a recruiter, various identifiers may be associated with the recruiter to differentiate those distribution channels.

As illustrated in FIG. 7, a sample of a recruit account record, of which one or more may be associated with or resident in the database 120 (FIG. 1), may include a recruit account identification (ID) field 705, a recruit action field 710, a recruit activity field 715, and a recruit identifier list field 720.

A recruit account record may be created in various ways. In at least one embodiment, a recruit account record is created when a recruit accesses the recruitment server 155 (FIG. 1). For example, when a recruit accesses the recruitment server 155, a recruit account identifier (ID) may be created.

The recruit account ID field 705 preferably contains a unique identifier of the recruit, which is preferably used consistently. For example, in at least one embodiment, the recruit account ID field 705 can include a randomly generated numerical code, and/or a text string indicating the content of a recruit account record. A recruit account ID serves to distinguish a recruit account record associated with a recruit from a recruit account record associated with other recruit(s). Although particular examples of identifiers are described herein, other types of identifiers uniquely indicating a recruit(s) may be utilized without departing from the spirit and scope of the embodiments.

As illustrated in FIG. 7, the string 'user1001' is the recruit account ID associated with the recruit account record 700 (FIG. 7). The recruit account ID field may include other information, such as the date and time when a recruit account ID was assigned, an indication of a recruiter and/or recruitment technique used, etc. For example, if a user(s) accesses the recruitment server 155 (FIG. 1) using a URL associated with a recruiter, the recruit account ID assigned to the recruit may include information of the URL, a counter which identifies the number of recruits associated with the URL, a time stamp, etc. If a URL used to access the recruitment server includes an indicator of a user identifier such as an email address, the identifier might be used as the recruit account ID.

The recruit actions field 710 (FIG. 7) may include information of one or more actions taken by a recruit which may be taken in order to become a recruit. For example, a recruited user may download a toolbar, may register with the search system and establish a login account, may make the search system landing page the homepage in a browser, may make the search engine the default search engine in a browser search appliance, may register to become a recruiter, or may take other actions. Such actions are recorded in the recruit actions field 710 of a recruit account record. The linkage between the recruit account ID field 705 and the recruit list field 620 (FIG. 6) may be used to determine compensation, rating, ranking, etc. for a recruiter. In at least one embodiment, information of actions of a recruit may be presented to a recruiter. For example, a GUI such as the recruiter dashboard GUI 1400 illustrated in FIG. 14 may be presented to a recruiter. Using the example in FIG. 7, the recruit 'user1001' took the actions 'default search', 'homepage', and 'become recruiter'. Such information might indicate that the recruit changed the recruit's default search engine, made the search engine landing page the recruit's homepage, and registered to become a recruiter, respectively. Information such as a time stamp might also be associated with an action to allow for analysis of a recruit action(s). For example, a recruit may elect to make the search system 130 the default search engine in a browser application at one time, and at a different time elect to make the search system landing page the homepage in the browser.

The recruit activity field 715 may include information of activities of a recruit. For example, a search query, a time stamp, an IP address, etc. which are associated with a recruit identifier which is associated with the content of the recruit account ID field 705 may be recorded in the recruit activity field 715. The tracked activity may be used to determine compensation for a recruiter. Using the example in FIG. 7, a search request associated with the recruit ID 'user1001' which contained the query string 'where is qatar', was received from 'IPaddress=12.12.130.212' on '13October2006,12.19.12' associated with the number '1222332', a search request associated with the recruit ID 'user1001' which contained the query string 'who is john gait', was received from 'IPaddress=12.12.130.212' on '13October2006,12.30.12' associated with the number '1222332', a selection of a link 'ayn rand books' associated with the recruit ID 'user1001' was received from 'IPaddress=12.12.130.212' on '13October2006,12.30.15' associated with the number '1222332' and a navigate to 'www.chacha.com' associated with the recruit ID 'user1001' was received on '13October2006,19.35.12' from the phone number '317.242.2422'.

The recruit identifier list field 720 includes information of identifiers which are associated with a recruit. Using the example in FIG. 7, the identifiers 'user1001'; '317.242.2422', 'AIMuser1001' and '1222332' have been associated with the recruit account ID 'user1001'. Using such identifiers, recruit activity and/or action may be associated with a recruit account record. Continuing with the example in FIG. 7, the activities in the recruit activity list 715 are associated with the recruit account record 700 using the identifiers '317.242.2422' and '1222332' associated with the recruit account ID 'user1001'.

Although only a few recruit activities are illustrated in FIG. 7, any or all recruit activities might be recorded. For example, any search request submitted to the search system 130 (FIG. 1) which is associated with a recruit ID may be recorded and analyzed to determine compensation for a recruiter. If a recruit activity includes clicking on an advertisement(s), using a service(s), viewing a search result(s), etc., compensation might be provided to a recruiter based on analysis of the information indicated in the recruit activity field 715 associated with a recruit account record associated with a recruit account ID indicated in the recruit list field 620 (FIG. 6) of a recruiter account record such as the recruiter account record 600.

For example, if more than a number of searches are conducted by a recruit in a given time period (e.g., more than 20 searches between the first and last day of a month) a recruiter may receive compensation. As another example, if a recruit activity(ies) indicates that some form of cheating or effort to falsely increase apparent usage is detected a recruit ID may be inactivated, and compensation of a recruiter(s) may be affected.

Figure 8:
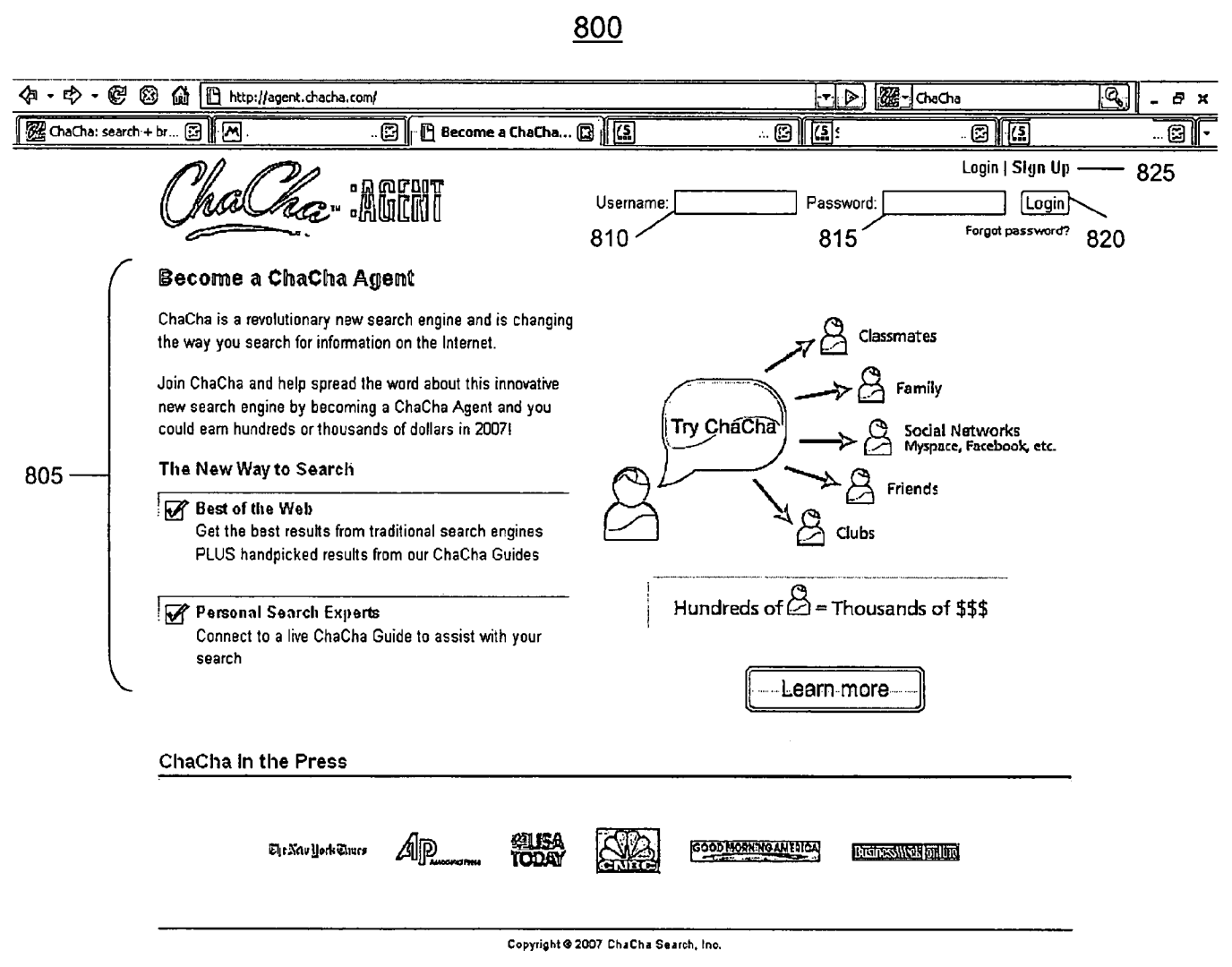

FIG. 8 illustrates an exemplary GUI 800 for sign-up and login by recruiters which might be presented by the recruitment server 155 (FIG. 1) and/or the search system 130. The GUI 800 may include an advertisement window 805, a username box 810, a password box 815, a login button 820 and a sign up control 825.

The advertisement window 805 includes information which may promote the recruitment program, the search system, etc. Any type of information may be presented in the advertisement window 805. The username box 810 allows a recruiter to enter an identifier of the recruiter such as a username. The password box 815 allows a recruiter to enter a password which may be used to verify access rights to the search system 130 (FIG. 1) and/or the recruitment server 155. The login button 820 (FIG. 8) allows a recruiter to indicate completion of entry of information and request access to the system 100 (FIG. 1). The sign up control 825 may consist of a link or other action control which generates a request to register as a recruiter. Activation of the sign up control 825 may cause a GUI such as the recruiter registration GUI 900 depicted in FIG. 9 to be presented.

In at least one embodiment, if a registered searcher or guide elects to become a recruiter, any or all of the information provided by a guide as part of a guide registration process may be used to register the guide as a recruiter.

Figure 9:
FIG. 9 illustrates a GUI.

FIG. 9 illustrates an exemplary GUI for registration of a recruiter. The recruiter registration GUI 900 may include an advertising window 905, an account information section 910, a personal information section 920, a terms of service section 940, a 'Create My Account' button 950, and a 'Cancel' button 960.

The advertisement window 905 may display an advertisement of any type. Multiple advertisement windows may be included in the recruiter registration GUI 900. The account information section 910 allows a recruiter to enter information used to access a recruiter account. The personal information section 920 allows a recruiter to enter personal information which may be required in order to register as a recruiter. The terms of service section 940 allows a recruiter to review and indicate acceptance of the terms of service associated with acting as a recruiter. The 'Create My Account' button 950 allows a recruiter to indicate completion of the information required in the recruiter registration GUI 900. If the information entered in the recruiter registration GUI 900 is complete, the tax application GUI 1000 illustrated in FIG. 10 may be presented to a recruiter. The 'Cancel' button 960 allows a recruiter to cancel registration and return to the GUI 800.

The account information section 910 may include a username entry box 912, a password entry box 914, a password confirmation box 916, and an email entry box 918. The user name entry box 912 allows a recruiter to enter a user name for accessing the recruiter account with the search system 130 (FIG. 1). The password entry box 914 allows a recruiter to enter a password. The password confirmation box 916 allows a recruiter to confirm a password entered in the password entry box 914. The email entry box 918 allows a recruiter to enter an email address which may be used for contacting the recruiter.

The personal information section 920 includes a recruiter first name box 921, a recruiter middle initial box 922, a recruiter last name box 923, a recruiter gender indicator 924, a recruiter phone number box 925, a recruiter address boxes 926, a recruiter city box 927, a recruiter state box 928, a recruiter postal code box 929 and a recruiter date of birth controls 930. The recruiter first name box 921 is a text box which allows a recruiter to enter a first name. The recruiter middle initial box 922 is a text box which allows a recruiter to enter a middle initial. The recruiter last name box 923 is a text box which allows a recruiter to enter a last name. The recruiter gender indicator 924 is preferably a drop-down list which allows a recruiter to indicate the recruiter's gender. The recruiter phone number box 925 is a text box which allows a recruiter to enter a 10-digit phone number. The recruiter address boxes 926 are text boxes which allow a user to enter a street address. The recruiter city box 927 is a text box which allows a recruiter to enter a city. The recruiter state box 928 is a text box or preferably a drop-down list which allows a recruiter to enter a state. The recruiter postal code box 929 is a text box which allows a recruiter to enter a 5 or 9 digit postal code. The recruiter date of birth controls 930 are text boxes or preferably a drop-down list(s) which allows a recruiter to enter date of birth information.

The terms of service section 940 includes a terms of service text window 941 and consent control 942. The terms of service text window displays the terms of service information to a recruiter and allows a recruiter to scroll upward and downward through the terms of service text. The consent control 942 allows a recruiter to indicate completion of review of the terms of service and acceptance of the terms of service. The consent control 942 may be inactive until a recruiter has scrolled to the bottom of the terms of service text in the terms of service window 941.

The 'Create My Account' button 950 is used to indicate completion of the recruiter registration GUI 900. The 'Cancel' button 960 is used to exit the recruiter registration GUI 900 without creating a recruiter account.

As illustrated in FIG. 10, upon completion of a registration page such as the recruiter registration GUI 900, the web browser of a prospective recruiter is directed to the tax application GUI 1000. The tax application GUI 1000 may include a personal information section 1005, a taxpayer identification section 1010, a certification section 1015, terms and conditions sections 1020, and a privacy notice section 1025, a progress tracker 1030 and the "Process Form" button 1035. The personal information section 1005 may include a first name text box 1040, the middle initial text box 1042, the last name text box 1044, the business name text box 1046 and the business type selection boxes 1048 for entry of the personal name and/or business name and/or business type of the prospective recruiter. As shown in FIG. 10, the personal information section 1005 may include multiple address text box lines 1050, 1052, a city text box 1054, a state text box or drop-down list 1056 and the postal code text box 1058 for entry of the prospective recruiter's address information. The taxpayer identification section 1010 includes a social security text box 1060 and an employer identification number text box 1062. Preferably the social security number text box and the employer identification number text box requires entry of numbers without dashes. The certification section 1015 includes a plurality of selection controls whereby a prospective recruiter may certify the validity of the information he or she provided. The selection controls may be check boxes, drop-down lists, and/or radio buttons. The terms and conditions section 1020 includes a plurality of scrollable text windows containing terms, conditions, restrictions, etc. associated with the information provided on the tax application page. The privacy notice section 1025 may include legal and/or other information associated with the rights, terms, conditions, etc. related to the collection of any information provided on the tax application page 1000. The tax application page 1000 also includes the progress tracker 1030 and the "Process Form" button 1035. The progress tracker 1030 includes an indication of the parts of a registration process which have been completed. Upon indicating any data required for the tax application page 1000, a prospective recruiter may click on the "Process Form" button 1035 or may otherwise indication completion of the registration page 1000.

Figure 11:
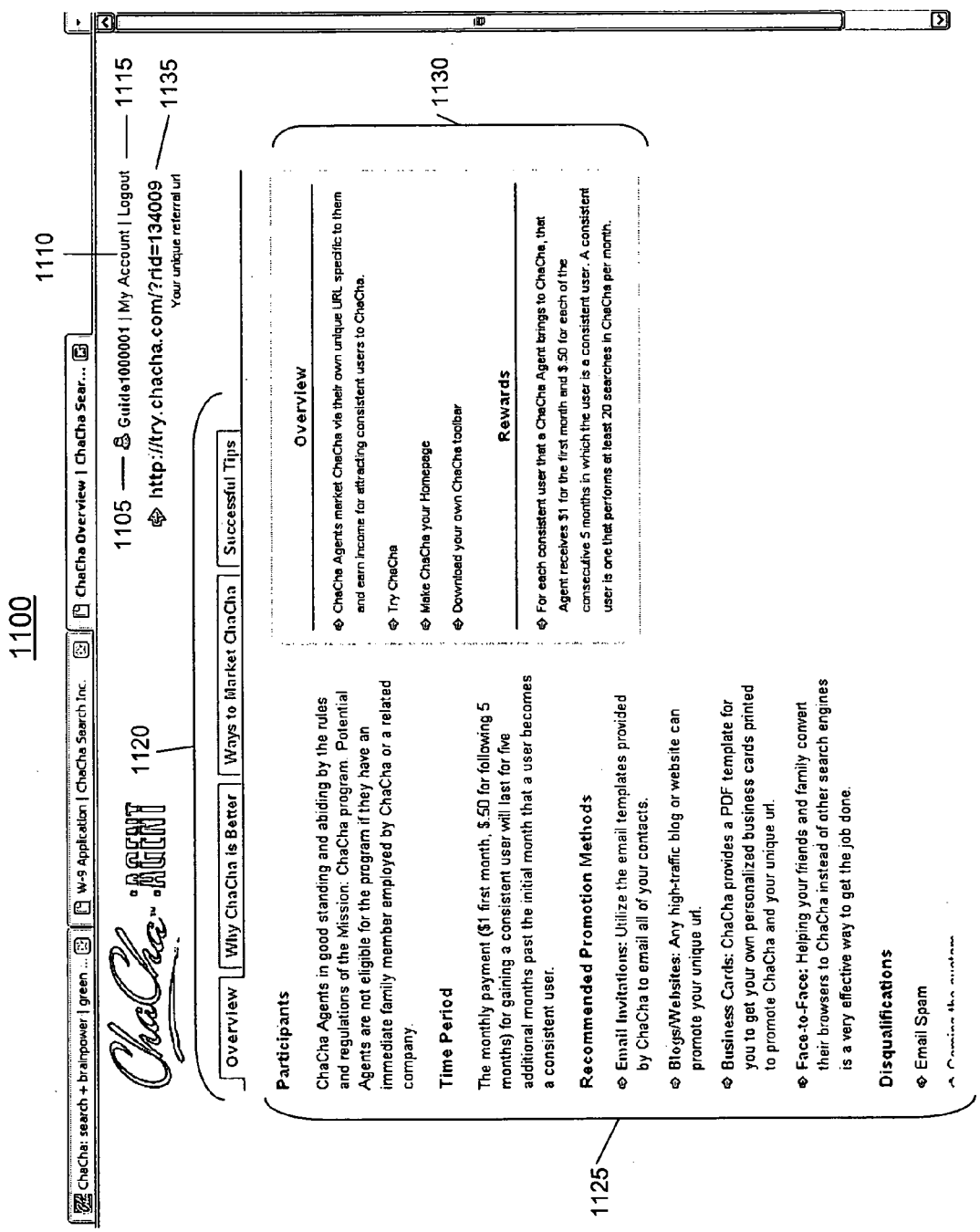
FIG. 11 illustrates a GUI.

As illustrated in FIG. 11, an exemplary introduction page is provided. The introduction page 1100 may be presented to a recruiter after completion of a registration process or on demand. The introduction page 1100 includes a recruiter overview control 1105, an account selection control 1110, a logout control 1115, selection tabs 1120, a contest rules section 1125, a summary section 1130, and a recruitment URL 1135.

The recruiter overview control 1105 causes the introduction page 1100 to be displayed when activated. The account selection control 1110 causes the account information GUI 1300 (FIG. 3) to be displayed when activated. The selection tabs 1120 allow a recruiter to view GUIs which may assist in promotion of the system, such as the recruitment techniques GUI 1200 depicted in FIG. 12. By selecting the 'Ways to Market ChaCha' tab, the recruitment techniques GUI 1200 (FIG. 12) may be presented. Any number of selection tabs may be presented in order to operate the embodiments.

The contest rules section 1125 includes information regarding a recruitment contest and/or other rules relating to recruitment methods, eligibility, etc. The summary section 1130 includes information regarding compensation and activities by recruits which may be measured and used to compensate a recruiter. The recruitment URL 1135 contains information of a URL which may be used for recruitment of users. Using the example illustrated in FIG. 11, the URL directs a user to a landing page such as the recruitment landing page GUI 1600 illustrated in FIG. 16, which will be further described herein below. The content of the recruitment URL may allow the search system 130 (FIG. 1) to identify a recruiter who is associated with a recruit.

Figure 12:
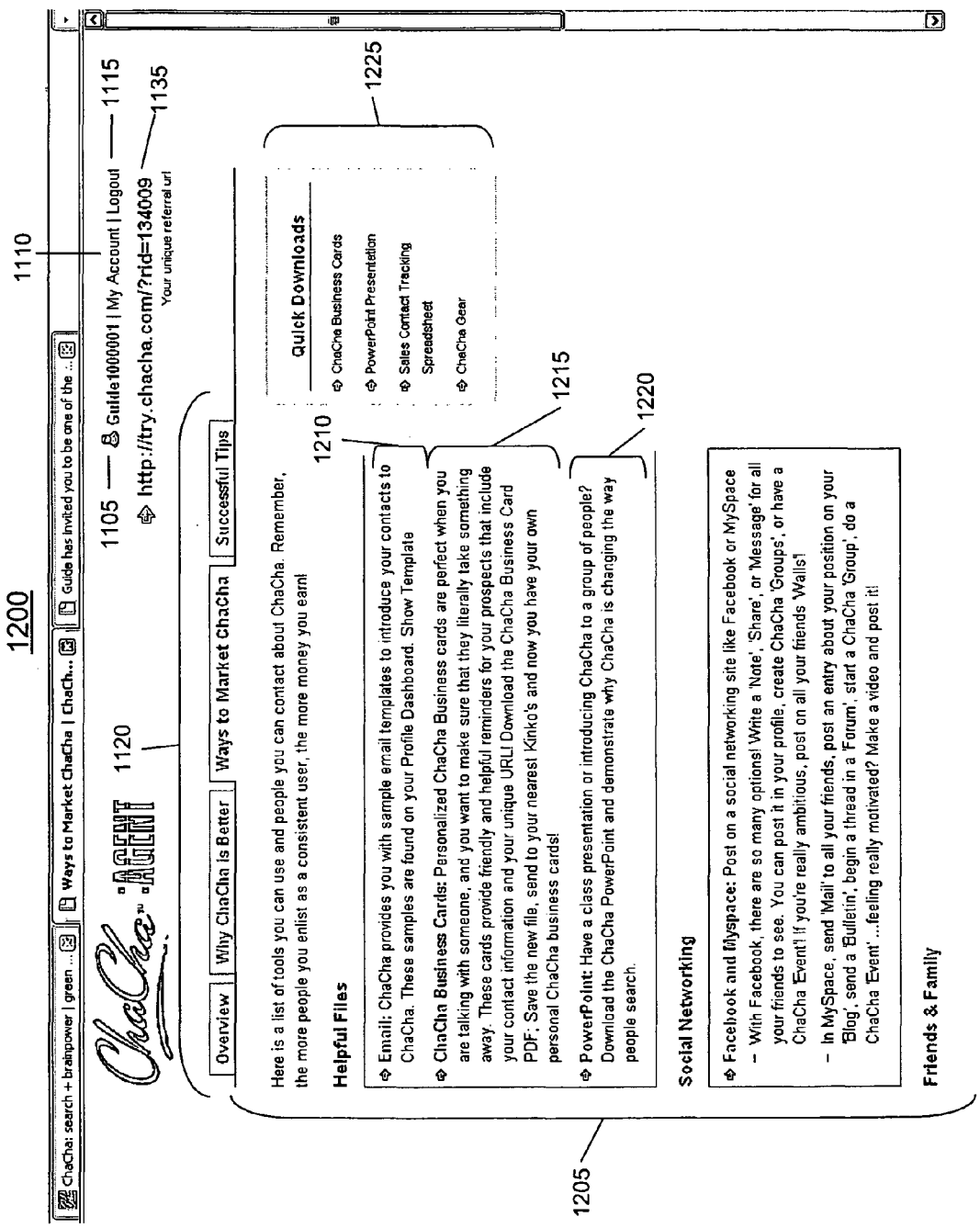
FIG. 12 illustrates a GUI.

Activation of the 'Ways to Market ChaCha' tab in the recruitment introduction page 1100 illustrated in FIG. 11 may cause the recruitment techniques GUI 1200 illustrated in FIG. 12 to be presented to a recruiter. The recruitment techniques GUI 1200 may include a recruiter overview control 1105, an account selection control 1110, a logout control 1115, selection tabs 1120, a recruitment methods section 1205, an email recruitment suggestion 1210, a printed media recruitment suggestion 1215, a presentation recruitment suggestion 1220, a recruitment links section 1225, and a recruitment URL 1135.

The recruiter overview control 1105, the account selection control 1110, and the logout control 1115 allow a recruiter to review overview documents, review account information and log-off of the system as previously described with respect to FIG. 11. The selection tabs 1120 allow a recruiter to select to view GUIs such as the introduction page 1100 or the recruitment techniques GUI 1200 as explained with respect to FIG. 11. The recruitment URL 1135 contains information of a URL which may be used for recruitment purposes, as previously explained with respect to FIG. 11.

The recruitment methods section 1205 contains information regarding recruitment methods which may be utilized by a recruiter. Various methods for recruitment are described which may allow a recruiter to effectively contact recruits. An email recruitment suggestion 1210, a printed media recruitment suggestion 1215 and a multimedia recruitment suggestion 1220 are provided along with other suggestions.

The email recruitment suggestion 1210 includes instructions for use of email for recruitment. Access to various recruitment tools may be provided. For example, access to an email functionality which allows a recruiter to generate personalized email messages which may be distributed to recruit users using email may be provided, or a group of email templates may be provided, and/or other instructions and tools for recruitment using email may be accessed.

Figure 15:
FIG. 15 illustrates a GUI.
Figure 16:
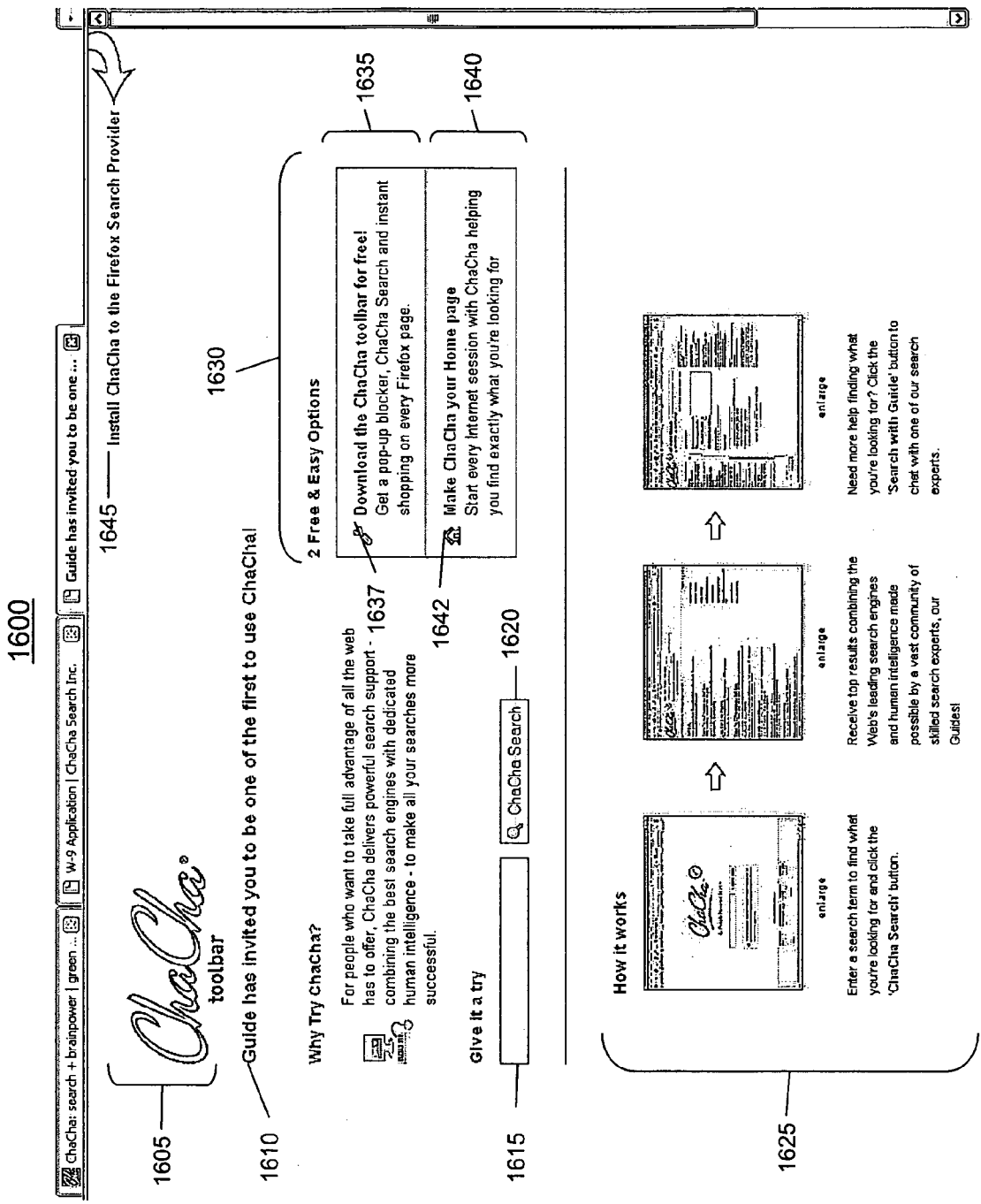
FIG. 16 illustrates a GUI.

The printed media recruitment suggestion 1215 may include instructions regarding use of printed media for recruitment. For example, a URL may be provided which causes a GUI such as the business card generation GUI 1500 illustrated in FIG. 15 to be presented. Information included in the printed media recruitment suggestion 1215 may assist a recruiter in using printed media to distribute recruitment information.

The multimedia recruitment suggestion 1220 may include a link to one or more electronic documents which may be used to create a recruitment media presentation. For example, a presentation template, a set of media generation tools, etc. which can be used to create multimedia based recruitment materials may be provided. Information included in the multimedia recruitment suggestion 1220 may assist a recruiter in creating video, audio and mixed-media recruitment materials.

The recruitment links section 1225 may contain links to recruitment tools such as a presentation, a tracking spreadsheet, printed media, promotional items, etc. Activation of links in the recruitment links section provides materials which may assist in recruitment.

As illustrated in FIG. 13, activation of the account selection control 1110 causes the account information GUI 1300 to be presented. The account information GUI 1300 includes a recruiter overview control 1105, an account selection control 1110, a logout control 1115, a recruitment URL 1135, account information selection tabs 1305, an account information section 1310, a personal information section 1315 and an 'Update Account' button 1340.

The recruiter overview control 1105, the account selection control 1110, and the logout control 1115 allow a recruiter to review overview documents, review account information and log-off of the system as previously described with respect to FIG. 11. The recruitment URL 1135 contains information of a URL which may be used for recruitment purposes, as previously explained with respect to FIG. 11. The account information selection tabs 1305 allow a recruiter to view various GUIs such as the account information GUI 1300, and the recruitment dashboard GUI 1400 by activating the respective tabs.

The account information section 1310 (FIG. 13) may include a username indicator 1312, an email address box 1314, and a password change control 1316. The username indicator 1312 displays a username associated with a recruiter. The email address box 1314 allows a recruiter to view and modify an email address associated with a recruiter account. The password change control 1316 allows a recruiter to elect to change a password associated with a recruiter account.

The personal information section 1315 contains personal information associated with a recruiter. The personal information section 1315 includes a first name box 1320, a middle initial box 1322, a last name box 1324, a gender indicator 1326, a phone number box 1328, address boxes 1330, a city box 1332, a state box 1334, and a postal code box 1336.

The first name box 1320 indicates and allows a recruiter to modify a first name associated with a recruiter account. The middle initial box 1322 indicates and allows a recruiter to modify a middle initial associated with a recruiter account. The last name box 1324 indicates and allows a recruiter to modify a last name associated with a recruiter account. The gender indicator 1326 allows a recruiter to view and modify the gender associated with a recruiter account. The phone number box 1328 allows a recruiter to view and modify a 10-digit phone number associated with a recruiter account. The address boxes 1330 allow a recruiter to view and modify a street address associated with recruiter account. The city box 1332 allows a recruiter to view and modify the city associated with a recruiter account. The state box 1334, which is preferably a drop-down list, allows a recruiter to view and modify a state associated with a recruiter account. The postal code box 1336 allows a recruiter to view and modify a postal code associated with a recruiter account. The 'Update Account' button 1340 allows a recruiter to submit information entered using the account information GUI 1300.

Activation of the 'Dashboard' selection tab in the selection tabs 1305 causes the recruitment dashboard GUI 1400 to be presented. The recruitment dashboard GUI 1400 includes a recruiter overview control 1105, an account selection control 1110, a logout control 1115, a recruitment URL 1135, account information selection tabs 1305, a download indicator 1405, a consistent user indicator 1410, a searches indicator 1415 and a monthly users indicator 1420.

The recruiter overview control 1105, the account selection control 1110, and the logout control 1115 allow a recruiter to review overview documents, review account information and log-off of the system as previously described with respect to FIG. 11. The recruitment URL 1135 contains information of a URL which may be used for recruitment purposes, as previously explained with respect to FIG. 11. The account information selection tabs 1305 allow a recruiter to view various GUIs such as the account information GUI 1300, and the recruitment dashboard GUI 1400 as previously described with respect to FIG. 13.

The download indicator 1405 indicates a number of recruits who have downloaded a toolbar, or taken other actions to indicate recruitment efforts. For example, if a recruited user downloads a toolbar or other application extension, this action may be indicated using the download indicator 1405.

The consistent user indicator 1410 indicates the number of consistent users who have been recruited by a recruiter. A consistent user may be defined according to business rules included in the search system 130 (FIG. 1). The number of consistent users may be further subdivided as further described herein below. For example, if a recruit meets criteria, such as making more than 20 search requests per month, the recruit may be designated as a consistent user. The consistent user indicator 1410 may be used by a recruiter to determine the effectiveness of a recruitment campaign.

As a user may take actions other than downloading a toolbar, such as making the search engine available in a search appliance in a browser, making a search engine page the homepage of a browser, creating a user account with the search system, etc. which may be associated with an identifier of a recruiter, other indications of recruitment activities may be indicated in the recruitment dashboard GUI 1400.

The searches indicator 1415 indicates the total number of search requests which have been originated by recruits of a recruiter. For example, each time a search request which includes an indicator of a recruiter is received, a count of searches attributable to that recruiter and/or recruitment method may be incremented.

The monthly users indicator 1420 indicates the number of consistent users in any given month. The monthly users indicator 1420 may allow a recruiter to track his ability to retain users and/or the effects of follow-on communications, etc.

Recruits may be segregated based on a recruitment method employed. For example, a recruiter might use one URL for email recruitment, and a different URL for print recruitment, and yet another URL for recruitment from a blog or other web page. Using such methods, a recruiter might be able to review the effect of various marketing techniques. In such a case, the recruitment URL 1135 may be implemented as a drop-down list which allows a recruiter to select one or more URLs associated with a recruiter in order to evaluate that particular group of recruits. While a non-significant indicator is used in the example in FIG. 11, a significant or human readable URL might also be used. For example, 'guide1000000.chacha.com' might be a recruitment URL which could be more easily recalled by friends and family of 'Guide OneMillion', or 'searchforcancer.com' might be a URL used to recruit users by a charitable organization associated with cancer research.

Activation of a link in the of the printed media suggestion 1215 (FIG. 12) may cause the printed media creation GUI 1500 to be presented. The printed media creation GUI 1500 may include an advertisement section 1505, a recruiter name section 1510, a recruiter email section 1515, and a recruitment URL section 1520.

The advertisement section 1505 includes promotional graphics or other information. More than one advertisement section may be included in the printed media creation GUI 1500. The recruiter name section 1510 contains, and is preferably pre-populated with a first and last name associated with a recruiter account. The recruiter email section 1515 contains, and is preferably pre-populated with an email address associated with a recruiter account. The recruitment URL section 1520 contains, and is preferably pre-populated with a URL associated with a recruiter and/or recruitment method.

While the GUI is preferably pre-populated, a recruiter may be allowed to modify any or all sections of the printed media creation GUI 1500. The recruitment URL section 1520 may be populated with any information which may be utilized to associate a recruiter, a recruit and/or a recruitment method with each other. This technique may allow for more detailed traceability of recruitment activities. While the printed media GUI 1500 is illustrated using a business card, other types of printed media might also be generated using the printed media creation GUI 1500.

Activation of a recruitment URL such as the recruitment URL 1135 (FIG. 11) may cause the recruitment landing page GUI 1600 to be presented. The recruitment landing page GUI 1600 may include an advertisement window 1605, a recruiter indicator 1610, a search box 1615, a search button 1620, an explanation section 1625, an action section 1630, a toolbar download section 1635, a homepage selection section 1640 and a search provider action control 1645.

The advertisement window 1605 contains information targeted to a recruited user. For example, a promotion of a recruiter such as a charity, or an advertisement selected by a recruiter based on the recruitment method, or a general advertisement may be presented in the advertisement window 1605. Multiple advertisement windows may be present in the recruitment landing page GUI 1600.

The recruiter indicator 1610 may include information associated with a recruiter who has directed a user to the recruitment landing page GUI 1600. For example, a recruiter name, picture, blog link, etc. might be presented in the recruiter indicator 1610. Alternately, if the recruiter is an organization, information relating to a recruitment goal or other information of the organization might be indicated in the recruiter indicator 1610. This feature may be used to personalize the experience of the recruitment landing page GUI 1600, and/or to help prevent recruitment fraud.

The search box 1615 allows a recruit to enter a search query. The search button 1620 allows a recruit to submit a search request to a search system such as the search system 130 (FIG. 1).

The explanation section 1625 includes information regarding the search system and operating instructions for a recruit.

The action section 1630 indicates an action(s) which a recruit may elect to take in order to become a recruited user. The toolbar download section 1635 may include an explanation and the toolbar download link 1637 which allows a user to download a toolbar extension to a browser as will be described further herein below.

The homepage selection section 1640 includes instructions and the homepage URL 1642 which may allow a user to designate a homepage of a browser in order to act as a recruited user as will be described further herein below.

The search provider action control 1645 allows a user to install a search engine in the search appliance section of a browser as will be described further herein below.

Figure 17:
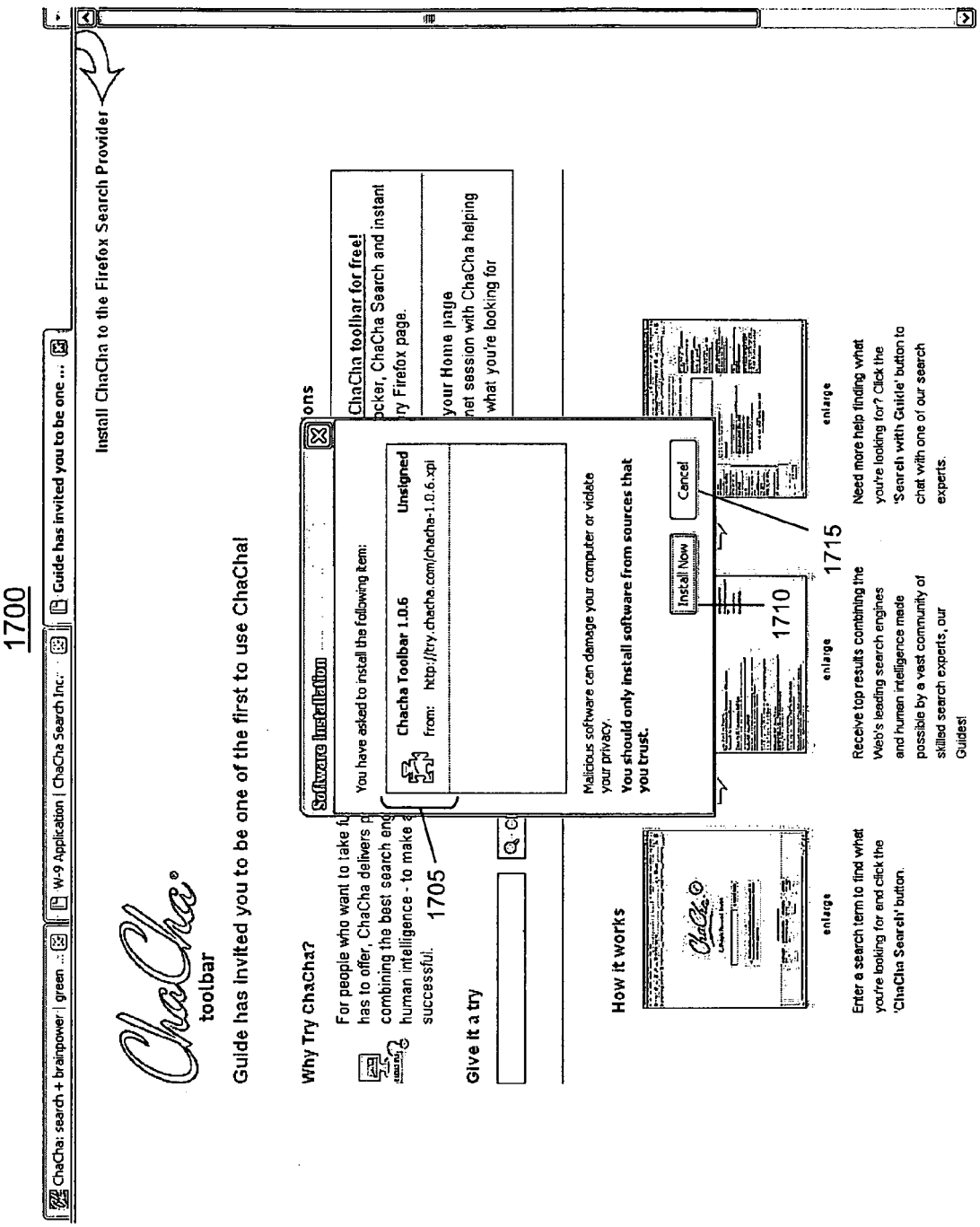
FIG. 17 illustrates a GUI.
Figure 18:
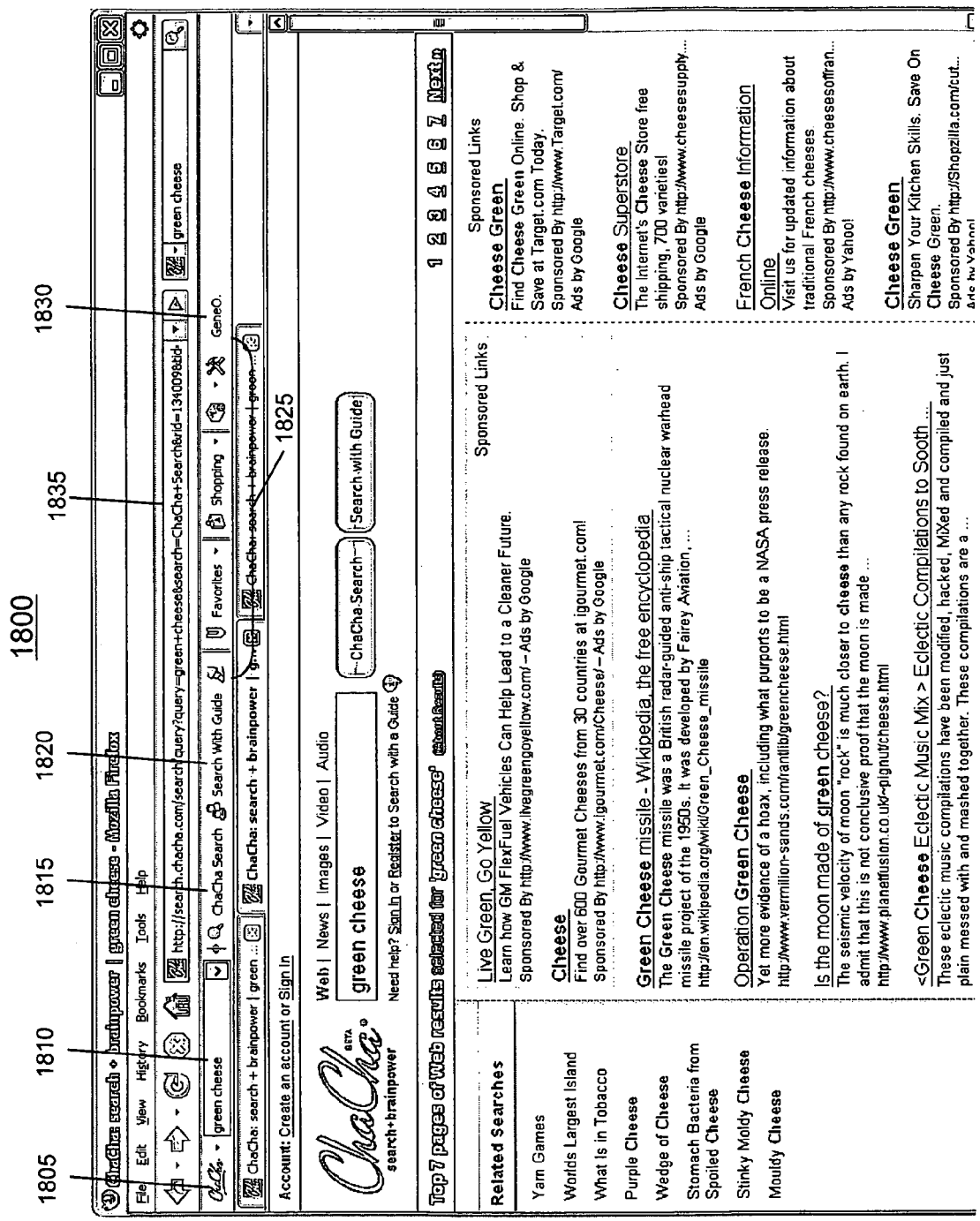
FIG. 18 illustrates a GUI.

Activation of the toolbar download link 1637 in the toolbar download section 1635 causes the toolbar download control GUI 1700 illustrated in FIG. 17 to be presented. The toolbar download control GUI 1700 may include toolbar identification information 1705, an 'Install Now' button 1710 and a 'Cancel' button 1715.

The toolbar identification information 1705 indicates the source of the toolbar extension, such as the recruitment server 155 (FIG. 1), and toolbar type and revision number, as well as other information about the toolbar or extension.

The 'Install Now' button 1710 allows a user to install the toolbar. The 'Cancel' button 1715 closes the toolbar download control GUI 1700 without downloading the toolbar.

Installation of a toolbar may cause additional information to be displayed in the browser of a recruited user. Subsequent to installation of a toolbar the search GUI 1800 illustrated in FIG. 18 may be presented to a recruited user. The search GUI 1800 may include a toolbar action button 1805, a search query box 1810, an unguided search button 1815, a guided search button 1820, auxiliary controls 1825, a recruiter identifier 1830 and a URL navigation box 1835.

The toolbar action button 1805 allows a user to take actions such as returning to the search homepage, obtaining information about the toolbar, uninstalling the toolbar, and other tasks. The search query box 1810 allows a user to enter a search query which may be submitted using the unguided search button 1815 or the guided search button 1820. The unguided search button 1815 submits the content of the search query box 1810 for a search without the use of a human searcher. The guided search button 1820 submits the content of the search query box for a search with a guide. Activation of the unguided search button 1815 or the guided search button 1820 sends a message to the search system 130 (FIG. 1) which includes an identifier of a recruiter and of the toolbar. For example, the URL navigation box 1835 indicates that the query 'green cheese' was submitted with a recruiter identifier (i.e., 'rid=134009') and a user identifier (i.e., 'tid=1222332') which were provided by the toolbar extension software.

The auxiliary controls 1825 include controls which allow a user to manage other items such as favorites, shopping, and other controls. The recruiter identifier 1830 includes an indicator of a recruiter, which may be a form of advertisement for a recruiter.

Figure 19:
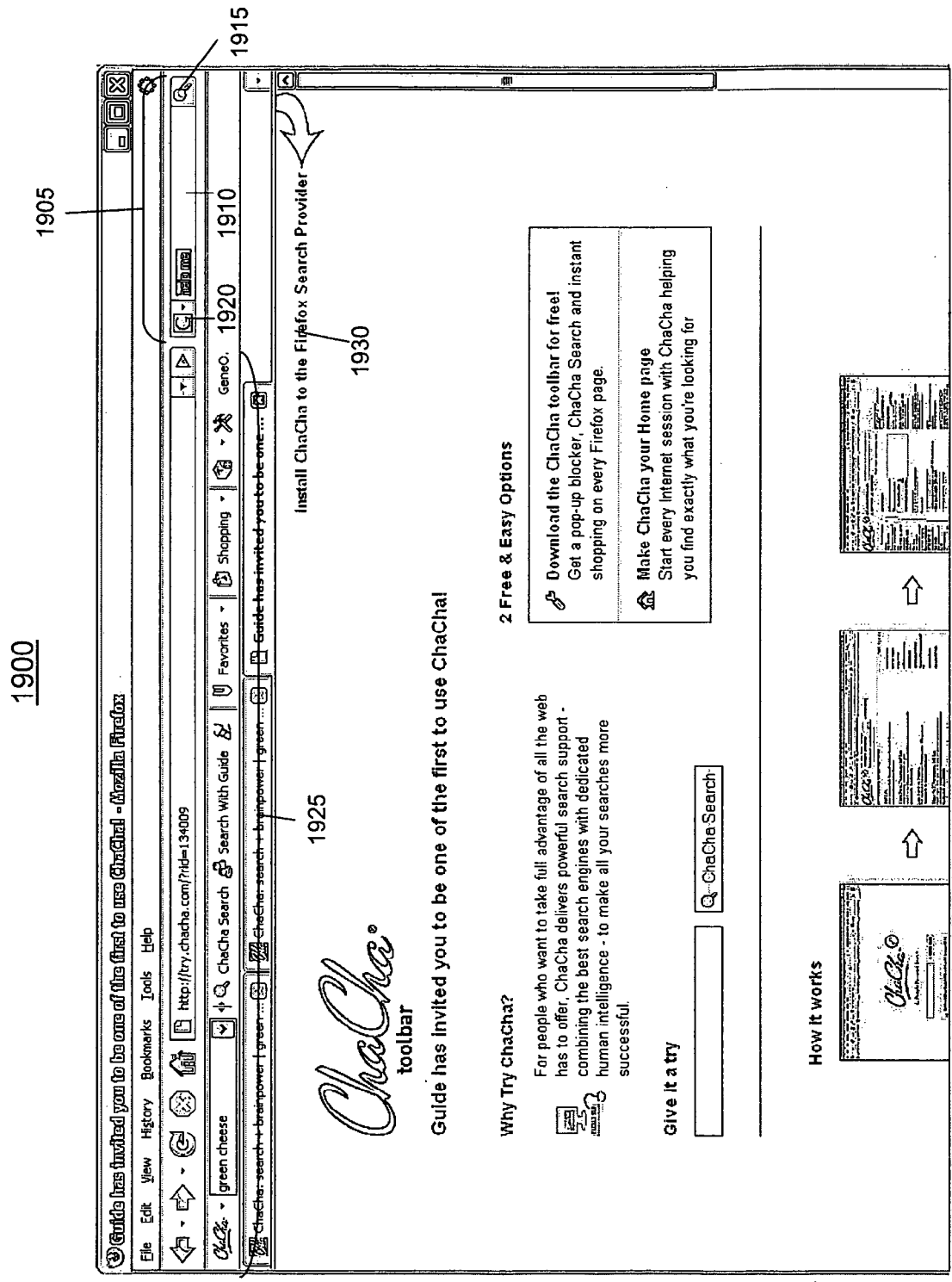
FIG. 19 illustrates a GUI.

As illustrated in FIG. 19, the initial search GUI 1900 may include a search engine provider appliance 1905, a search toolbar 1925, and a search provider activation control 1930. The search engine provider appliance 1905 may be provided as part of a browser application. The search engine provider appliance 1905 allows a user to utilize a search engine for a search query. The query is entered in the search appliance query box 1910 and submitted using the search appliance search button 1915, to a search service indicated in the default search provider indicator 1920.

The search engine provider appliance 1905 may allow a user to submit a query or search request without using a toolbar. A user may elect to suppress the search toolbar 1925, for example, in order to reduce visual overload and/or expand viewing area, but still desire to be able to access search services using the search engine provider appliance 1905.

In such an instance, a recruited user may elect to add a new search engine to be available in the search engine provider appliance 1905. By activating the search provider activation control 1930, a user may change the default search provider in the search engine provider appliance 1905.

Figure 20:
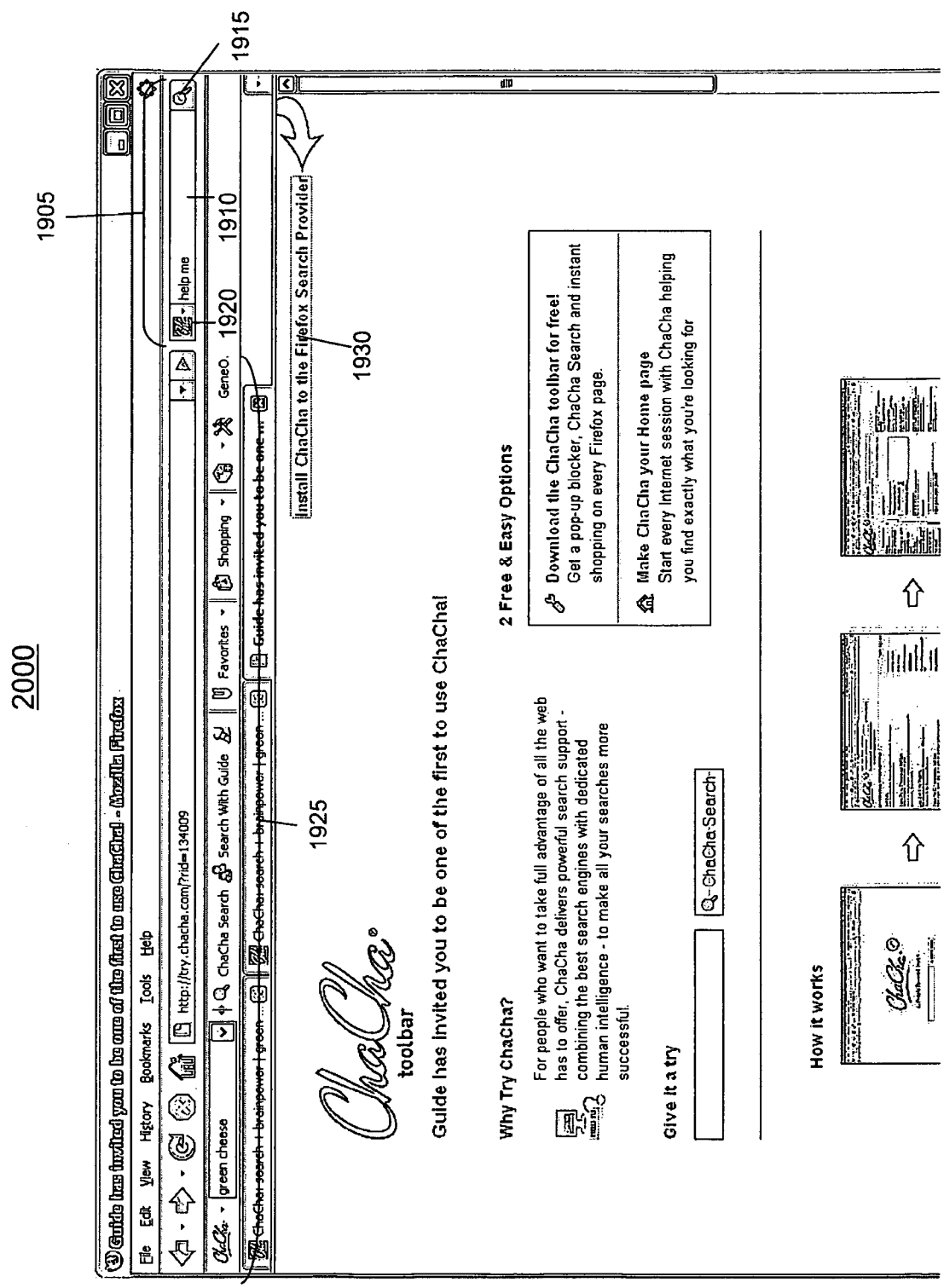
FIG. 20 illustrates a GUI.

As illustrated in FIG. 20, the revised search GUI 2000 is provided after the activation of the search provider activation control 1930. The search engine provider appliance 1905 now includes a new default search provider, as indicated in the default search provider indicator 1920.

Figure 21:
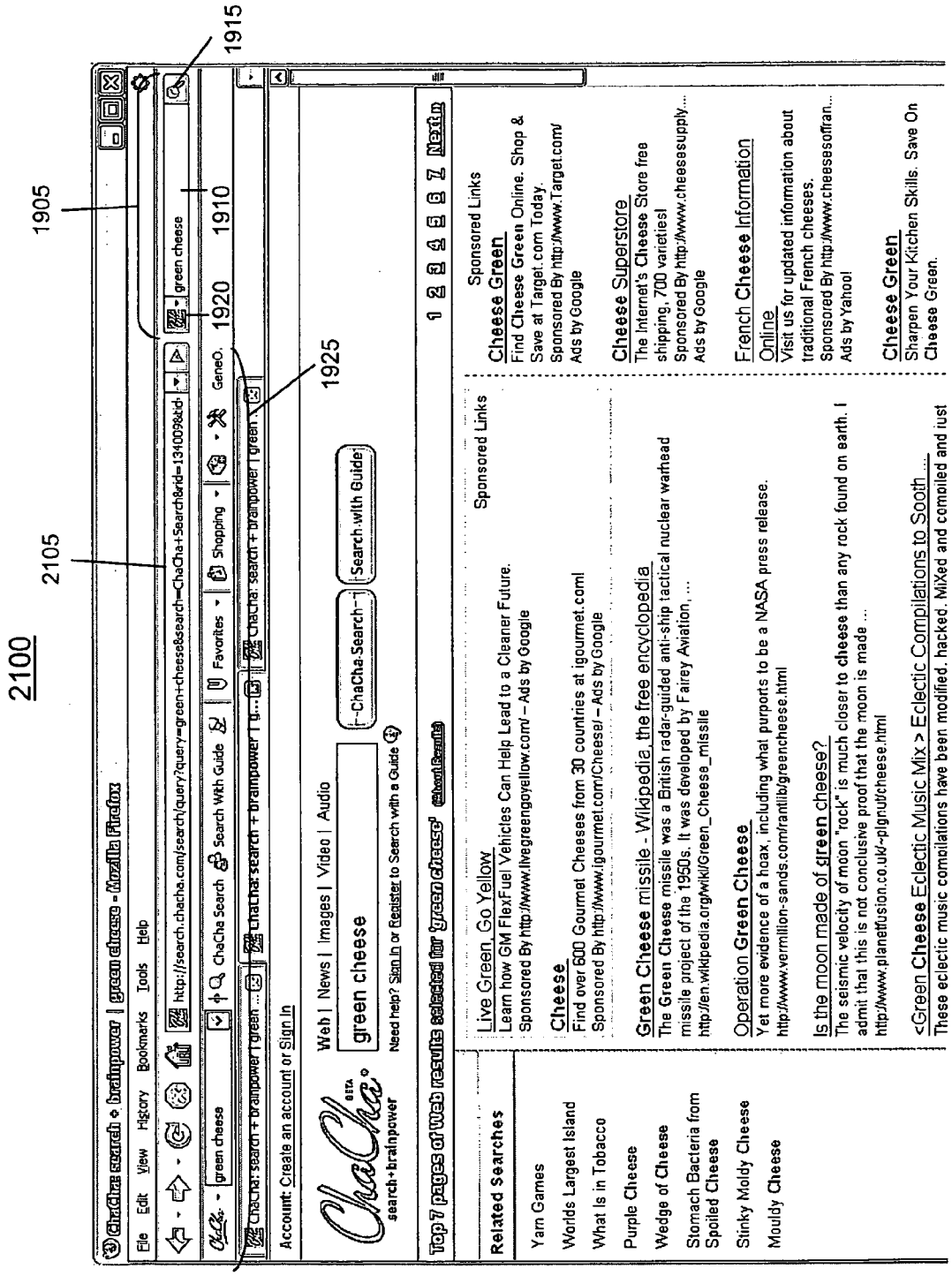
FIG. 21 illustrates a GUI.

If a search query is subsequently submitted using the search engine provider appliance 1905, a search query is submitted to the search system 130 (FIG. 1) which includes an identifier of the recruiter and the search engine provider appliance 1905. In such a case, the search request results GUI 2100 illustrated in FIG. 21 is displayed. The search request results GUI 2100 includes a URL in the navigation box 2105 which includes a recruiter ID (i.e., 'rid=134009') and user ID (i.e., 'tid=144cnd . . . ') as part of a search request submitted using the search engine provider appliance 1905.

Figure 22:
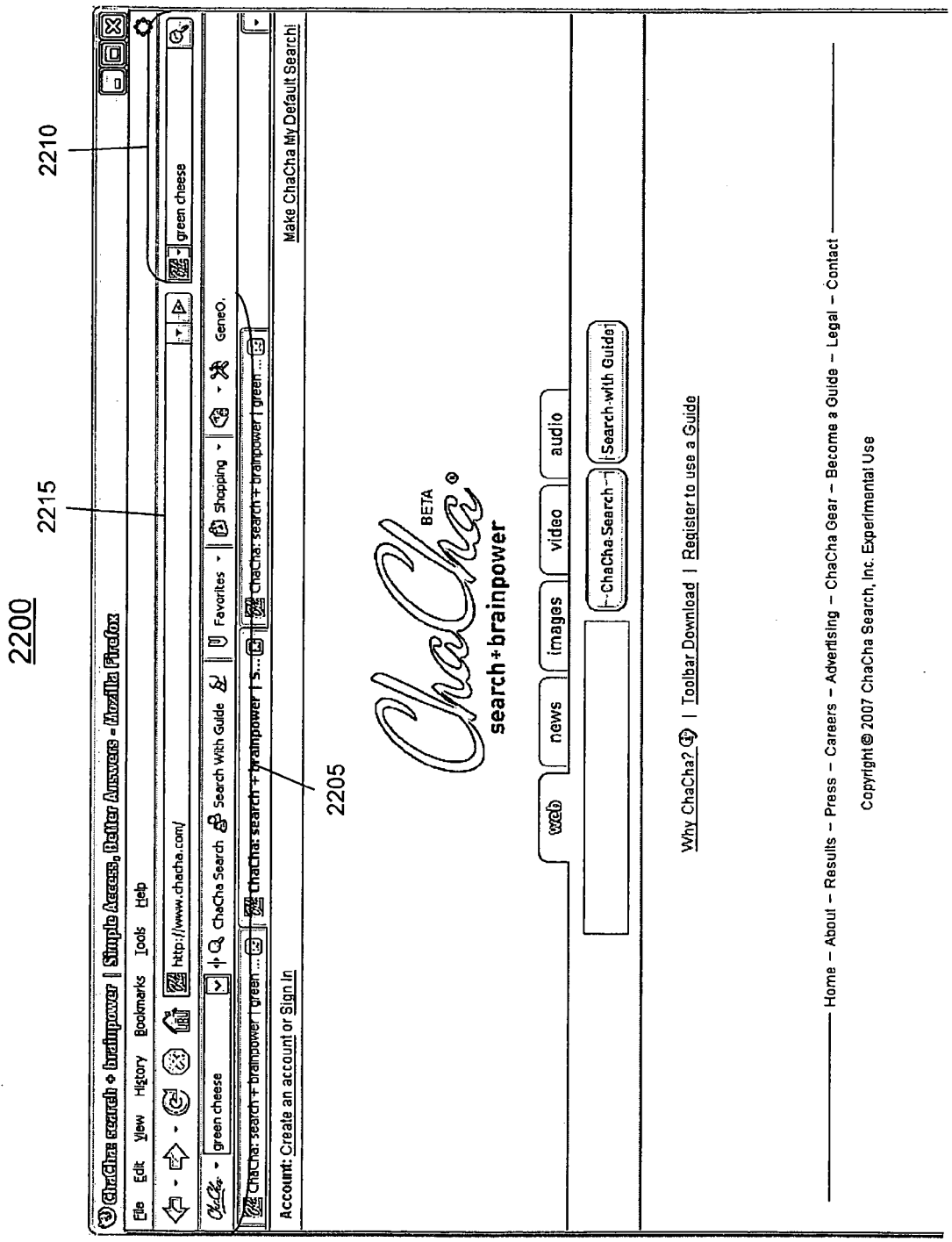
FIG. 22 illustrates a GUI.

If a user visits the homepage of the search system 130 (FIG. 1) by entering a URL in the navigation box of a browser, the default landing GUI 2200 may be presented to a user. The default landing GUI 2200 may include a search toolbar 2205, a navigation box 2215, and a search engine provider appliance 2210 which have been installed and/or modified in order that a recruited user may be linked to a recruiter. However, a user may elect not to use the search toolbar 2205 or the search engine provider appliance 2210 to submit a search request. If a user sets the homepage of a browser to be the search engine homepage as illustrated in the default landing GUI 2200, some activities may not be credited to the recruiter. This is illustrated by the absence of a recruiter identifier in the navigation box 2215 as illustrated in FIG. 22.

Figure 23:
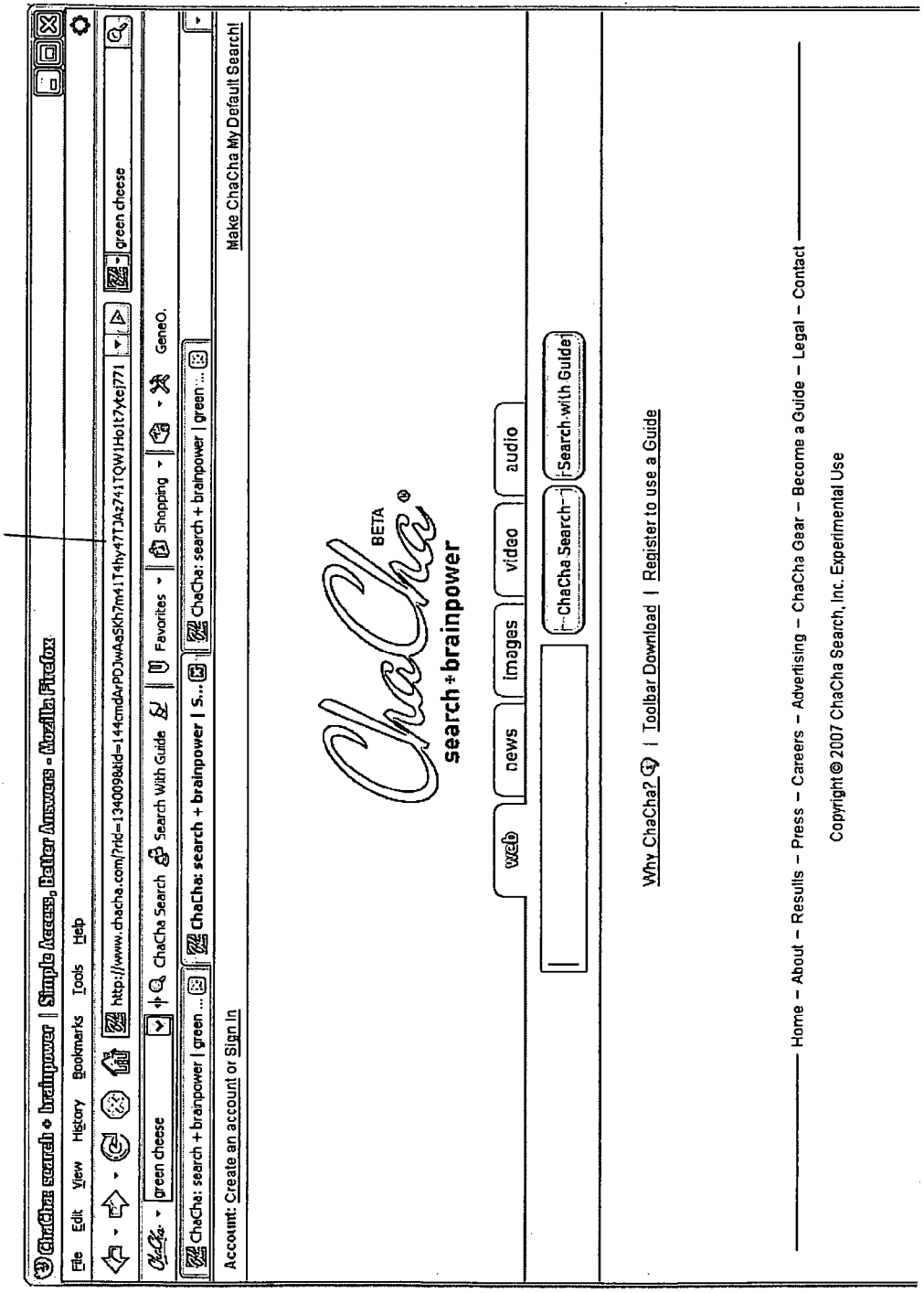
FIG. 23 illustrates a GUI.

If a recruit activates the homepage URL 1642 (FIG. 16) of the homepage selection section 1640 of the recruitment landing page GUI 1600 the default homepage of the user's browser application is then redirected to the recruited user homepage 2300 illustrated in FIG. 23. The URL indicated in the navigation box 2305 of the recruited user homepage 2300 includes a recruiter ID and a user ID which allows the search system 130 (FIG. 1) to identify a recruiter associated with the recruited user and the recruited user.

As various types of activity may include search activities and/or page views, a recruiter may be credited for any or all activities of a recruited user. Because a different identifier may be associated with a default homepage, a search from a search engine provider appliance, and/or a search from a toolbar each type of activity may be tracked independently. In this way, conversion of recruits may be traced. For example, a recruiter may elect to make the search engine a default homepage initially, subsequently the recruit may elect to make the search system the default provider in a search appliance, and then may elect to download a toolbar extension in order to utilize human guides more efficiently. The recruit is not required to divulge personally identifying information or to create a login. However, if a recruited user establishes a login, that action may be credited to a recruiter, and various identifiers of a recruit may be associated with the recruit as described with respect to FIG. 7.

Figure 14:
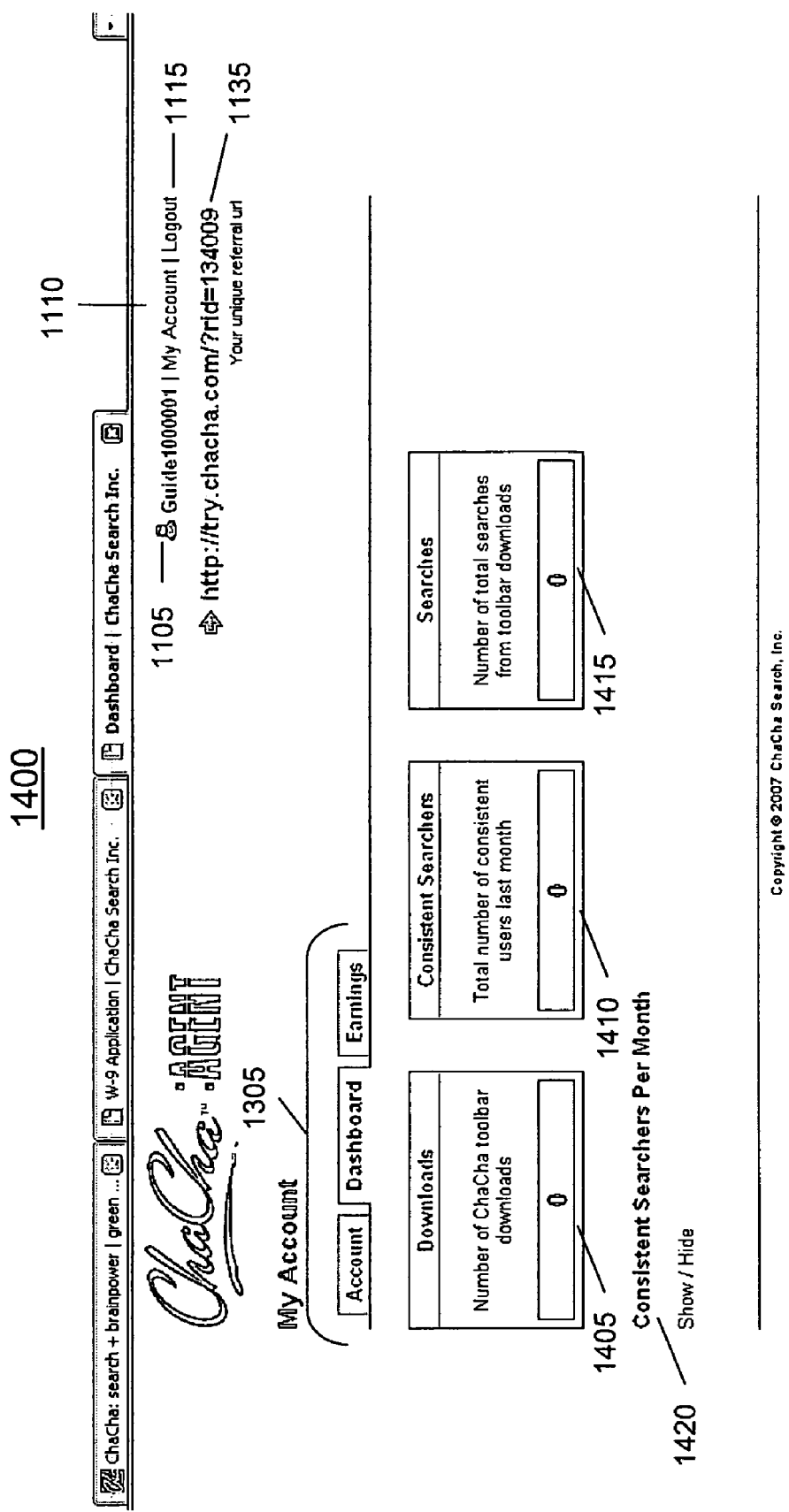
FIG. 14 illustrates a GUI.

Any or all traceable activities may be reported by the search system 130 (FIG. 1) using a GUI such as the recruiter dashboard GUI 1400 illustrated in FIG. 14. A recruiter may be able to review homepage views, searches from a browser appliance, searches from a toolbar, etc., in order to determine user preferences and review recruit actions based on other factors such as a recruitment method, time, follow-up communications, etc.

The identifier of a recruit and/or a recruiter may be used to modify actions of the search system 130 (FIG. 1). For example, when a recruit initiates a search for the first time each day a landing page which is based on the recruiter ID may be displayed. This may be used as a promotional activity for the recruiter and/or may inform a recruit of information which has not been previously presented. Such activity may be used to promote affiliation of the user with a search service and/o a recruiter.

As a recruitment method may include a unique identifier, a recruit may be identifiable to a recruiter and/or the search system 130 (FIG. 1). For example, a recruiter might print business cards which each contain a unique identifier in the URL printed on the card. By tracking the recipient of each business card or group of cards, a recruiter may be able to determine whether a recruited user is enjoying success, or may have feedback to improve the search services. For example, a recruiter might have a block of URLs which are assigned to the recruiter. As a user(s) visits the recruitment server 155 (FIG. 1) using the URLs assigned to the recruiter, he or she may be allowed to access another block of URLs for recruitment purposes. By tracking the recruited groups and the recruitment methods, a recruiter may be able to increase compensation of a recruiter. A recruiter may also act as a feedback mechanism for the search system. If a group of recruited users changes its behavior, a recruiter may be able to obtain information about the cause.

If a recruiter is an organization, company or other entity, a group of recruiter identifiers may be assigned to the recruiter. In such a case, a recruiter may assign a subset of the recruiter identifiers to various purposes. For example, a group of recruiter identifiers might be utilized in connection with websites operated by the entity, a group of recruiter identifiers might be associated with individual members of the entity who recruit users, etc. The overall compensation may be allocated to the entity, while individuals associated with one or more recruiter identifiers may be tracked and/or compensated. Thus, the promotional system may be used by an entity to earn compensation for the entity while retaining information of various types of recruitment activities.

In at least one embodiment, when a recruit visits the recruitment server 155 (FIG. 1) an identifier is assigned based on the time and date of the contact. This may allow traceability of unique consistent users. For example, even though the recruiter may not know personal information about a recruit. The recruiter may be able to determine if there is turnover in the recruited user base.

While the recruitment actions have been described in terms of downloading a toolbar, and other browser related activities, other types of recruitment methods might be used. For example, if a recruiter creates a local access number for mobile search services and then forwards those calls to a voice-based service of the search system, such activity might be traced in a manner similar to the recruitment URLs. As the recruiter may redirect a query from one telephone number to another, such information may be used to compensate a recruiter.

While the viral marketing system has been described in terms of promotion of search services, other types of products or services which are promoted using viral marketing might use the method and systems to recruit people and compensate recruiters. For example, an auction website might use viral marketing and incentives to recruiters to promote awareness and use of the service. Recruiters might be compensated based on sales revenue generated by recruited users.

The many features and advantages of the claimed invention are apparent from the detailed specification and, thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A computer-implemented method, comprising:
distributing an encrypted identifier of a recruiter;
recording an identifier based on a random number as a current identifier of a recruit when determining that a message is received indicating the encrypted identifier of the recruiter;
receiving a request for information;
compensating the recruiter when determining that the request for information indicates the current identifier of the recruit; and
obtaining the current identifier of the recruit, producing a modified identifier based on the current identifier of the recruit and storing the modified identifier of the recruit as the current identifier of the recruit when determining that the request for information indicates the current identifier of the recruit.

2. The computer-implemented method of claim 1, wherein the request for information is augmented by a browser appliance which provides the current identifier of the recruit.

3. The computer-implemented method of claim 2, comprising:
tracking an activity of the recruit responsive to a search result provided responsive to the request for information to determine a compensation for the recruiter.

4. The computer-implemented method of claim 3, wherein the recruiter is provided with the compensation based on a ranking of the recruiter based on a count of recruits associated with the recruiter and a ranking of the recruit based on the tracking.

5. The computer-implemented method of claim 3, comprising:
displaying information indicating each activity performed based on a communication service indicated by the encrypted identifier associated with the recruiter.

6. The computer-implemented method of claim 2, wherein the request for information is directed to a human guide registered to conduct a search when determining that the request is associated with a suspended recruiter.

7. The computer-implemented method of claim 1, wherein the encrypted identifier encodes a communication medium used by the recruiter for said distributing of the encrypted identifier.

8. The computer-implemented method of claim 1, wherein said compensating is based on receiving a URL of a search system landing page uniquely associated with the recruit, a modification to a search appliance of a browser to include a code associated with the search system, a registration of the recruit with the search system and a download of a tool bar extension associated with the recruiter.

9. The computer-implemented method of claim 1, wherein the encrypted identifier is sent to the recruit using at least one of an electronic mail message, a blog posting, a voice message, a text message, an Instant Message and printed media.

10. The computer-implemented method of claim 1, wherein a plurality of recruiters are registered, and
 a software application extension provided to the recruit modifies an indicator of the current identifier subsequent to the receiving of the request for information.

11. A system, comprising:
 a server distributing an encrypted identifier to a recruiter, assigning a first identifier as a current identifier of a recruit when determining that a message is received indicating the encrypted identifier, replacing the current identifier with a modified identifier when determining that a search request indicates the current identifier, and determining a compensation of the recruiter based on the message and the search request; and
 a database tracking activities of a recipient of a search result provided responsive to the search request indicating the encrypted identifier, where a message received indicating a subscriber identifier of the recruit increments a count used to determine the compensation of the recruiter and associates the subscriber identifier and the recruit with the recruiter when determining that the subscriber identifier is not associated with the recruit.

12. The system of claim 11 further comprising:
 a recruiter system:
  receiving information of search requests, search appliance installations, and web page views by recruits associated with the recruiter;
  sending an invitation including the encrypted identifier to a user system;
  tracking an activity of a user responsive to the invitation; and
 the server penalizing a recruiter when determining that the activities of the recipient meets a predetermined pattern,
 the user system generating a registration request indicating the encrypted identifier and receiving personally identifying information of the recruiter responsive to the message; and
 a searcher system performing a search responsive to the search request from the user system when determining that the search request indicates a human assisted search, and does not indicate the current identifier.

13. A computer readable medium having a program stored therein to cause a computer to execute operations, comprising:
 distributing, by a recruiter, an invitation message to use a search service including an unique identifier of the recruiter;
 receiving a registration request indicating the unique identifier;
 assigning an initial identifier as a validated identifier of a user when determining that the registration request comprises a change to a browser home page;
 assigning the initial identifier as the validated identifier of the user when determining that the registration request comprises a modified default search service of the browser;
 assigning the initial identifier as the validated identifier of the user when determining that the registration request comprises a download of an extension to an application;
 assigning the initial identifier as the validated identifier of the user when determining that the registration request comprises a request to register a user identifier and security information;
 determining whether a request for information received by the search service indicates the validated identifier;
 incrementing a count of usage of the search service by the user and assigning a modified identifier based on the validated identifier as the validated identifier when determining that the request for information indicates the validated identifier; and
 providing a compensation for the recruiter based on the registration request and the count.

14. A computer-implemented method of viral marketing, comprising:
 assigning an encrypted identifier to a recruiter;
 distributing, to a user, information of a search service including an invitation to use the search service and the encrypted identifier of the recruiter, said information encoding a distribution medium for sending the invitation to the user;
 presenting personally identifying information of the recruiter to the user responsive to receipt of a message indicating the encrypted identifier, and tracking an action of the user responsive to the personally identifying information, said action being associated with the identifier of the recruiter based on acceptance of the identifying information of the recruiter by the user;
 compensating the recruiter when determining that the action is page view of the search service;
 compensating the recruiter when determining that the action is an installation of an application extension associated with the search service;
 compensating the recruiter when determining that the action is a modification of stored information associated with a browser affecting use of the search service;
 compensating the recruiter when determining that the action is a search request and that the user interacts with a result of the search request; and
 penalizing the recruiter when determining that the action is associated with a predetermined pattern.

* * * * *